(12) United States Patent
Saia et al.

(10) Patent No.: US 12,335,205 B2
(45) Date of Patent: Jun. 17, 2025

(54) AUTOMATED INTERACTIVE COMMUNICATION TRIGGER IN MESSAGE DISTRIBUTION

(71) Applicant: Airship Group, Inc., Portland, OR (US)

(72) Inventors: Anthony Saia, Chandler, AZ (US); Seth Miller, Mesa, AZ (US); Spencer Lund, Scottsdale, AZ (US); Ryan Lepinski, Portland, OR (US); Brandon O'Halloran, Omaha, NE (US); Armando Spataro, Chandler, AZ (US); Daniel Seidel, San Francisco, CA (US)

(73) Assignee: Airship Group, Inc., Portland, OR (US)

( * ) Notice: Subject to any disclaimer, the term of this patent is extended or adjusted under 35 U.S.C. 154(b) by 287 days.

(21) Appl. No.: 17/964,906

(22) Filed: Oct. 12, 2022

(65) Prior Publication Data

US 2023/0122680 A1    Apr. 20, 2023

Related U.S. Application Data

(60) Provisional application No. 63/256,214, filed on Oct. 15, 2021.

(51) Int. Cl.
*H04L 51/02* (2022.01)
*H04L 51/04* (2022.01)
(Continued)

(52) U.S. Cl.
CPC .............. *H04L 51/02* (2013.01); *H04L 51/04* (2013.01); *H04L 51/216* (2022.05); *H04W 4/029* (2018.02)

(58) Field of Classification Search
CPC . H04L 51/14; H04L 65/1089; H04L 65/4015; H04L 61/1594; H04L 65/1059;
(Continued)

(56) References Cited

U.S. PATENT DOCUMENTS 5,873,106 A    2/1999 Joseph
6,230,309 B1    5/2001 Turner et al.
(Continued)

FOREIGN PATENT DOCUMENTS

KR    10-1545285 B1    8/2015

OTHER PUBLICATIONS

PCT International Search Report and Written Opinion, PCT Application No. PCT/US2020/044901, dated Nov. 6, 2020, ten pages.
(Continued)

*Primary Examiner* — Fadi Haj Said
(74) *Attorney, Agent, or Firm* — Fenwick & West LLP

(57) ABSTRACT

A message management server may receive selections, from a message publisher, to build a message series. The message series includes one or more messages and a live chat triggering condition. The message management server may generate a message series preview of the message series. The message series preview includes a simulation of a message in the message series. The message management server may receive a command from the message publisher to launch the message series. The message management server may transmit at least one of the messages in the message series to an end user. The message management server may determine that the live chat triggering condition is met. The message management server may launch a live chat based on the live chat triggering condition being met. The live chat connects the end user to a natural person agent.

20 Claims, 12 Drawing Sheets

(51) Int. Cl.
*H04L 51/216* (2022.01)
*H04W 4/029* (2018.01)
(58) Field of Classification Search
CPC .. H04L 65/1069; G06F 3/04842; H04W 4/16; H04W 4/50; H04W 4/21; G06Q 50/01; H04N 7/15
See application file for complete search history.

(56) References Cited

U.S. PATENT DOCUMENTS

| | | | |
|---|---|---|---|
| 7,669,177 B2 | 2/2010 | Gerber et al. | |
| 7,881,439 B1* | 2/2011 | Cohn | H04M 3/4938 379/9.03 |
| 8,065,600 B2 | 11/2011 | Chorv et al. | |
| 8,380,803 B1* | 2/2013 | Stibel | G06Q 30/0255 709/206 |
| 8,494,077 B2* | 7/2013 | Haustein | H04L 25/03343 375/267 |
| 8,543,577 B1* | 9/2013 | Ben-Artzi | G06F 16/355 707/738 |
| 9,351,193 B2 | 5/2016 | Raleigh et al. | |
| 9,485,177 B2 | 11/2016 | Tung et al. | |
| 9,602,661 B2 | 3/2017 | Rauenbuehler et al. | |
| 9,621,735 B2 | 4/2017 | Ting et al. | |
| 9,635,057 B2 | 4/2017 | Bone et al. | |
| 9,654,581 B2 | 5/2017 | Pollack et al. | |
| 9,911,290 B1 | 3/2018 | Zalewski et al. | |
| 9,959,551 B1* | 5/2018 | Schermerhorn | H04L 67/63 |
| 10,200,486 B2 | 2/2019 | Herrick et al. | |
| 10,732,782 B1 | 8/2020 | Krivopaltsev et al. | |
| 11,232,465 B2 | 1/2022 | Orr et al. | |
| 2004/0183838 A1 | 9/2004 | Lahiri | |
| 2006/0284878 A1 | 12/2006 | Zimmer | |
| 2006/0294199 A1 | 12/2006 | Bertholf | |
| 2007/0005717 A1 | 1/2007 | LeVasseur et al. | |
| 2009/0167553 A1 | 7/2009 | Hong et al. | |
| 2010/0287566 A1 | 11/2010 | Hauser | |
| 2011/0264996 A1 | 10/2011 | Norris | |
| 2012/0227000 A1 | 9/2012 | McCoy et al. | |
| 2012/0260209 A1* | 10/2012 | Stibel | G06Q 40/02 715/780 |
| 2013/0019182 A1 | 1/2013 | Gil et al. | |
| 2013/0173734 A1* | 7/2013 | Oteiza Lacalle | H04L 51/224 709/207 |
| 2013/0212487 A1 | 8/2013 | Cote | |
| 2013/0219307 A1 | 8/2013 | Raber et al. | |
| 2014/0006129 A1* | 1/2014 | Heath | G06Q 30/02 705/14.23 |
| 2014/0100669 A1 | 4/2014 | Hammack et al. | |
| 2014/0258055 A1 | 9/2014 | Wolfe et al. | |
| 2014/0273915 A1* | 9/2014 | Corley | H04W 4/90 455/404.1 |
| 2014/0282218 A1 | 9/2014 | Kaufman et al. | |
| 2015/0049157 A1* | 2/2015 | Krishnamoorthy | H04L 65/1089 348/14.1 |
| 2015/0049160 A1* | 2/2015 | Krishnamoorthy | H04L 65/1069 348/14.03 |
| 2015/0049164 A1* | 2/2015 | Krishnamoorthy | H04N 7/147 348/14.11 |
| 2015/0112990 A1* | 4/2015 | van Os | G06F 16/435 707/737 |
| 2015/0160931 A1 | 6/2015 | Glazer et al. | |
| 2015/0161088 A1 | 6/2015 | Kamada | |
| 2015/0193537 A1* | 7/2015 | Cierniak | G06F 16/9535 707/706 |
| 2015/0212984 A1* | 7/2015 | Bowden | G06Q 50/01 715/234 |
| 2015/0229592 A1 | 8/2015 | Rathod | |
| 2015/0350068 A1 | 12/2015 | Tung et al. | |
| 2016/0007198 A1 | 1/2016 | Lacey et al. | |
| 2016/0012465 A1* | 1/2016 | Sharp | G06Q 20/321 705/14.17 |
| 2016/0066273 A1 | 3/2016 | Prats | |
| 2016/0110083 A1* | 4/2016 | Kranendonk | H04L 51/52 715/753 |
| 2016/0150021 A1 | 5/2016 | Britt et al. | |
| 2016/0328715 A1* | 11/2016 | Gideoni | G06Q 20/401 |
| 2017/0041742 A1 | 2/2017 | Toksvig et al. | |
| 2017/0142191 A1* | 5/2017 | Caldwell | H04L 67/52 |
| 2017/0193851 A1 | 7/2017 | McNichol et al. | |
| 2017/0279759 A1* | 9/2017 | Liden | H04L 65/1069 |
| 2017/0282736 A1 | 10/2017 | Goei | |
| 2018/0084111 A1 | 3/2018 | Pirat et al. | |
| 2018/0156925 A1* | 6/2018 | Johns | G01S 5/01 |
| 2019/0108585 A1* | 4/2019 | Caldwell | G06Q 40/03 |
| 2020/0127951 A1* | 4/2020 | Shah | H04L 12/1813 |
| 2020/0404390 A1* | 12/2020 | Lieberman | H04N 21/436 |
| 2021/0281528 A1 | 9/2021 | Orr et al. | |

OTHER PUBLICATIONS

Boltclock, "Revision—Stack Overflow," https://stackoverflow.com/revisions/8426901/2, 1 page, Dec. 8, 2011.
European Patent Office, Extended European Search Report and Opinion, EP Patent Application No. 20162248.7, dated Jun. 25, 2020, nine pages.
Extended European Search Report, European Application No. 15739969.2, dated Aug. 30, 2017, 12 pages.
Leiva, L., "Ace: An Adaptive CSS Engine for Web Pages and Web-based Applications," WWW2012 Developer Track, Apr. 2012, pp. 1-4.
Leiva, L., "Interaction-based user interface redesign," Proceedings of the 2012 ACM International Conference on Intelligent User Interfaces, Feb. 2012, pp. 311-312.
PCT International Search Report and Written Opinion, PCT Application No. PCT/US15/11986, dated Apr. 9, 2015, 9 pages.
United States Office Action, U.S. Appl. No. 14/506,990, dated Jan. 12, 2017, 24 pages.
United States Office Action, U.S. Appl. No. 14/506,990, dated Jun. 15, 2018, 12 pages.
United States Office Action, U.S. Appl. No. 14/506,990, dated Nov. 16, 2017, 22 pages.
United States Office Action, U.S. Appl. No. 16/381,590, filed Aug. 20, 2020, 11 pages.
W3C, "Selectors API Level 1," Feb. 21, 2013, eight pages, [Online] [Retrieved on Jun. 12, 2020] Retrieved on the Internet <URL: https://www.w3.org/TR/selectors-api/>.
W3SCHOOLS, "CSS Selector Reference," https://www.w3schools.com/cssref/css_selectors.asp, 9 pages, Jan. 1, 2014.

* cited by examiner

Form Submittal Chat Inbox

Chat created when end-user submits a form - Conversation starts once an agent responds. Agent can respond on their time, and address higher priority issues Example: Help Request Form

FIG. 5B

LIVE | ○ Setup ○ Content ○ Delivery ⊙ Review

Automation Name
Guest Checked In

Trigger
- Custom Event
  Trigger when an event fires.

Custom Events
Search for custom events by name

Options

Rule Limits
Control the frequency of messages delivered by this automation for a specified period.

Conditions
Deliver this message if a set of audience conditions are met.

Cancellation Events
Do not send if an event occurs.

Channels
- iOS
- Android
- Amazon
- Web

530

Live Conversations
Build Key Relationships, Answer Important Questions, & Generate Results

| My Convos | All Convos |
|---|---|

Select an agent

Geff Molt
Working
Agent: Al Sparo

Carl Oh
Yes, I'd like to talk.
Agent: Al Noe

Unknown
(602) 800-2550
How do I opt in?
Agent: Shred

Sid
hi
Agent: Sid Myer

Unknown
(972) 293-2545
Thanks for calling to...
Agent: Tom Kell

Axel Jegot
Still having trouble?
Agent: Axel Jegot

Unknown
Another one
Agent: Byrn Giles

Unknown
sending out
Agent: Sid Meyer

The ride was great
6/16, 5:57 AM

Hi Ted, congratulations on your new purchase. I look forward to being of ....
7/07, 5:48 AM Hi Ted, I can see you opened a new auto policy.
7/08, 6:49 AM I am on way to pickup order
7/08, 6:49 AM I am outside of store to pickup order #2152
7/08, 6:50 AM Hi Ted, this is Bill with Bell. I am happy to meet with you.
7/15, 5:56 PM Hi Ted, I can help you save money on your purchase.
7/16, 7:22 AM Yes, I'd love to talk.

Send

BO  Brandon O

Details          Activity History

Channel: Apple Push Notification
Message Series ID: FDES032943243
Triggering Conditions: Hotel check in

AUTOMATED INTERACTIVE
COMMUNICATION TRIGGER IN MESSAGE
DISTRIBUTION

CROSS REFERENCE TO RELATED
APPLICATION

This application claims the benefit of U.S. Provisional Application No. 63/356,214, filed Oct. 15, 2021. The content of which is incorporated herein by reference in its entirety.

TECHNICAL FIELD

The present disclosure generally relates to a server that distributes messages to recipients on behalf of message publishers and, more specifically, to the initiation of an interactive session in message distribution.

BACKGROUND

Communication channels are often associated with their own requirements, protocols and limitations. An organization may encounter technical difficulties in trying to transmit a message designed for one channel via another channel. The appearance, contents, and overall feeling of the message may be changed significantly when a different channel is used to deliver the message. In some cases, the change in channels may render the message completely undeliverable. On one hand, an organization may not be equipped with the technical specialty to freely switch messages between channels. On the other hand, sending messages through a single channel or a limited set of channels may not be an effective communication strategy. The issue could be especially challenging if communications become more interactive, such as when the message recipient may interactive with a server based on the messages sent.

BRIEF DESCRIPTION OF THE DRAWINGS

FIG. 5B is an example GUI for a message publisher to set up an automation, in accordance with some embodiments.

FIG. 6 is a conceptual diagram illustrating an example GUI for a messaging platform, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed embodiments herein are related to a message management server that provides a platform for message publishers to build message series with different messages. Some of the message series may involve a trigger point for the user or the system to launch an interactive communication such as a live chat feature. The messages in the message series may be transmitted to message recipients via different channels. A message publisher may specify triggering conditions for various actions in the message series. The actions may include transmission of additional messages, transmission of specific links such as a deep link or an adaptive link, sharing of information or message to a social media, and launching of a live chat feature that allows the message recipient to chat with a natural person agent. The natural person agent may be a customer service specialist or a salesperson assigned to a transaction. The message management server may automatically identify message recipients for the initial message in the series based on the initial triggering conditions of the series. The message management server may continue to monitor event notifications related to the message recipients and take additional actions specified in the series when conditions are met. Each message may be sent via a different channel as specified by the message recipients or the message publisher. The platform may include a graphical user interface to provide previews of the messages as rendered in various end-user device models when the messages are delivered via the specified channels.

Example System Environment

Figure 1:
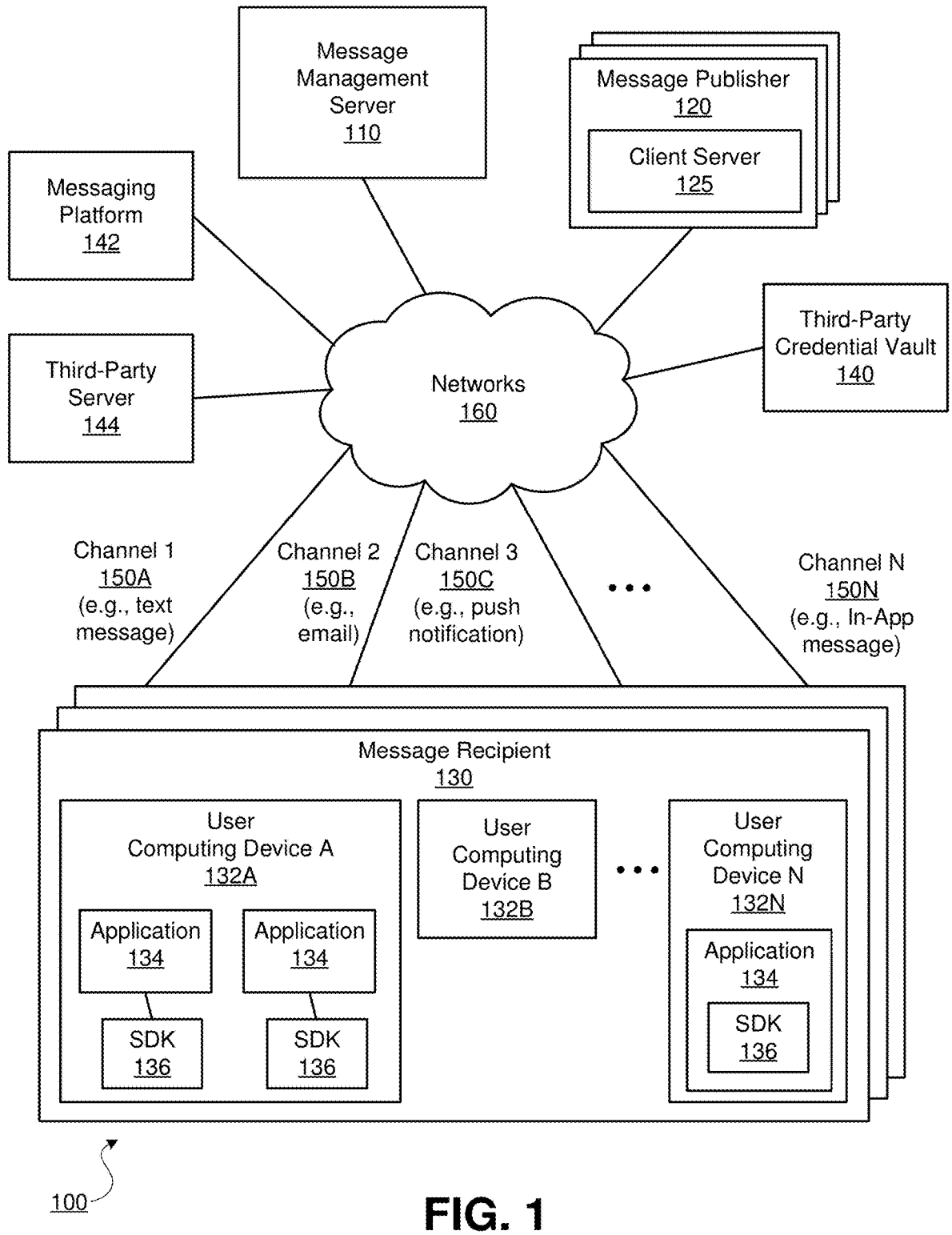
FIG. 1 is a block diagram illustrating an example system environment, in accordance with an embodiment.

Referring now to FIG. 1, shown is a block diagram illustrating an embodiment of an example system environment 100 for performing a cross-channel two-way messaging process, in accordance with an embodiment. By way of example, the system environment 100 includes a message management server 110, one or more computing devices associated with one or more message publishers 120, one or more message recipients 130 who possess user computing devices 132, a third-party credential vault 140, a messaging platform 142, and a third-party server 144. Each message recipient 130 may be associated with one or more user computing devices 132 (e.g., 132A, 132B, . . . , 132N (N being an nth device, n being some number; generally computing devices 132)). The entities and components in the system environment 100 may communicate with each other through networks 160. The message management server 110 may communicate with various user computing devices 132 through different channels 150 (e.g., 150A, 150B, 150C, . . . , 150N (N being an nth device, n being some number); generally channels 150). In various embodiments, the system environment 100 may include fewer or additional components. The system environment 100 also may include different components. Also, while some of the components in the system environment 100 may sometimes be described in a singular form, the system environment 100 may include one or more of each of the components. For example, there may be multiple message publishers 120 and multiple message recipients 130. Various message publishers 120 may be independent entities such as different customers of the message management server 110, which serves as a service provider that manages the message distribution and associated actions such as launching a live chat on behalf of the message publishers 120.

The message management server 110 may include one or more computers that perform various tasks related to transmitting messages to various message recipients 130 on behalf of different message publishers 120, determining conditions and channels to transmit various messages, transmitting a series of messages using different channels 150, receiving responses from message recipients 130, forwarding the responses to the message publishers 120, and, in some cases, taking actions on behalf of the message publishers 120 based on the responses from the message recipients. The message management server 110 may also launch an interactive communication feature such as a live chat between an agent and an end user, who may be a message recipient 130 of a message series. For example, the message management server 110 may send various messages to a message recipient 130 on behalf of a message publisher 120. The message management server 110 monitors the conditions and events related to the message recipient 130. If a triggering condition is met, the message management server 110 will take an action such as launching a live chat to allow the message recipient 130 to communicate with the message publisher 120 directly and instantaneously through the live chat. After an interactive communication feature is launched, the message management server 110 may serve as the intermediate server that forwards instant messages between the message publisher 120 and the message recipient 130.

The message management server 110 may include a combination of hardware and software. The message management server 110 may include some or all example components of a computing machine described with FIG. 7. The message management server 110 may also be referred to as a message managing platform or simply a computing server. The management server 110 may take different forms. In one embodiment, the message management server 110 may be a server computer that executes code instructions to perform various processes described herein. In another case, the message management server 110 may be a pool of computing devices that may be located at the same geographical location (e.g., a server room) or be distributed geographically (e.g., clouding computing, distributed computing, or in a virtual server network). The message management server 110 may also include one or more virtualization instances such as a container, a virtual machine, a virtual private server, a virtual kernel, or another suitable virtualization instance. The message management server 110 may provide message publishers 120 with various message management services and merchant services as a form of cloud-based software, such as software as a service (SaaS), through the networks 160. Examples of components and functionalities of the message management server 110 are discussed in further detail below with reference to FIG. 2.

Message publishers 120 are various organizations and individuals that use the message management server 110 as a service to distribute messages. The message publishers 120 may be the customers of the message management server 110. The message publishers 120 can be of different natures and can be any suitable types of organizations, natural persons, or robotic devices. For example, a message publisher 120 can be a government entity that provides important or emergency messages to citizens. In another example, a message publisher 120 can be an educational institute that sends announcements to its students through different channels 150. Some message publishers 120 may also be private businesses or individuals. In one case, a retail business may be a message publisher 120 that uses the service of the message management server 110 to distribute marketing announcements and advertisements to various message recipients 130. In another case, another retail business may use the message management server 110 to transmit gift cards, coupons, store credits, and receipts as various forms of messages to message recipients 130. In yet another case, a message publisher 120 may be an airline that sends passes (e.g., boarding passes) and flight status updates to message recipients 130. In yet another case, a message publisher 120 may be a bank that sends statements and payment reminders to message recipients 130. In yet another case, a message publisher 120 may be a news organization that sends news and articles to its subscribers. In yet another case, a message publisher 120 may be a social networking system that sends feeds and contents to message recipients 130. In yet another case, a message publisher 120 may be an individual who sends messages to his families, friends, and other connected individuals. In yet another case, a message publisher 120 may be a retail company that sends offers to its customers and the customers may make in-application purchase by directly responding to the message. These are non-exhaustive examples of message publishers 120. A message publisher 120 may be an independent entity of the message management server 110 or may control the message management server 110, depending on embodiments. Various message publishers 120 may be independent and unrelated entities, such as different unrelated businesses.

A message publisher 120 may retain one or more agents that perform instant interactive communications such as live chat sessions with the customers of the message publisher 120. The agents may be natural person agents and/or robotic agents. For example, the message publisher 120 may be a business that retains a team of customer service specialists who conduct live chats with the end users. In another example, an agent may be a salesperson who is assigned to a particular transaction or a particular customer. As it will be discussed in further detail, the message management server

110 may monitor a triggering condition to launch an instant interactive communication session to connect an agent of the message publisher 120 to an end user, who may be a message recipient 130 of various messages in a message campaign distributed by the message management server 110 on behalf of the message publisher 120.

Each message publisher 120 may be associated with one or more client servers 125 that are used to communicate with the message management server 110 and message recipients 130. The client servers 125 may also be referred to as message publisher servers 125, message publisher devices 125 or client devices 125. Each client server 125 may be a computing device that can transmit and receive data via the networks 160. The client server 125 may include some or all of the example components described with FIG. 7. A client server 125 performs operations of various day-to-day tasks of the corresponding message publisher 120. For example, a bank (an example message publisher 120) may include a server 125 that manages the balances of accounts of its customers, processes payments and deposits, and performs other banking tasks. In another example, an airline (another example message publisher 120) may include a server 125 that manages the flight statuses, generate boarding passes, and manages bookings of the customers. A client server 125 may also be a server for controlling and operating software applications 132 that are published by the message publisher 120 and are installed at different user computing devices 132. The precise operations of a client server 125 may depend on the nature of the corresponding message publisher 120.

A message publisher 120 may interact directly with its customers or end users, who are examples of message recipients 130, and may delegate certain operations, such as sending certain types of messages maintaining a messaging platform for a live chat feature, to the message management server 110. A message publisher 120 may maintain accounts of its users and manage day-to-day interactions with the users while directing the message management server 110 to distributes messages to the users on behalf of the message publisher 120. For example, the message publisher 120 may use a message management system provided by the message management server 110 to design messages and set conditions, channels, and intended recipients of the messages. The message publisher 120, through the message management server 110, may launch a message campaign that includes a series of messages to be automatically delivered to various message recipients 130. The message campaign may involve delivering various messages through different channels 150. The message campaign may also include a special trigger that causes the message management server 110 to take a specific action such as launching a live chat. In some cases, the message management server 110 may take different actions based on the responses provided by the message recipients 130.

In some embodiments, a message may be considered to be transmitted from the message publisher 120 regardless of whether the message publisher's server directly sends the message or the message management server 110 sends the message.

To design a message campaign or to perform some other operations, a message publisher 120 may communicate with the message management server 110 through the client server 125 or a computing device associated with the message publisher 120. The methods of communication may vary depending on embodiments and circumstances. For example, an individual associated with a message publisher 120 (e.g., an employee) may communicate with the message management server 110 through a web application that is run by a web browser such as CHROME, FIREFOX, SAFARI, INTERNET EXPLORER, EDGE, etc. In another case, the message management server 110 may publish a mobile application or a desktop application that includes a graphical user interface (GUI). An individual associated with a message publisher 120 may use the mobile or desktop application to communicate with the message management server 110. In yet another case, a client server 125 may communicate directly with the message management server 110 via other suitable ways such as application program interfaces (APIs).

A message recipient 130 is an intended recipient of messages that may be designed by a message publisher 120 and sent from the message management server 110. Message recipients 130 may be users, customers, subscribers, viewers, or any suitable message recipients of the message publisher 120. Message recipients 130 may also be referred to as end users or simply users. Message recipients 130 can be individuals, organizations, or even robotic agents. Each message recipient 130 may possess one or more user computing devices 132. The user computing devices 132A, 132B, ... 132N may be of different kinds. For example, a user may have a smart phone, a laptop computer, and a tablet. One or more user computing devices 132 may have the components of a computing machine illustrated in FIG. 7. Examples of user computing devices 132 include personal computers (PC), desktop computers, laptop computers, tablets (e.g., iPADs), smartphones, wearable electronic devices such as smartwatches, smart home appliances (e.g., smart home hubs and controllers), vehicle computer systems, or any other suitable electronic devices.

User computing devices 132 may also include one or more Internet-of-Things (IoT) devices. An IoT device may be a network-connected device embedded in a physical environment (e.g., building, vehicles, appliances (home or office), etc.). In some cases, an IoT device has general processing power that is comparable to a computer. In other cases, an IoT device may have limited processing resources, low power, and limited bandwidth for communications. For example, an IoT device may be a sensor. An IoT device may be configured to gather and provide information about its physical environment. In various embodiments, an IoT device connects to the network 160 to provide information gathered from and/or associated with the environment. Data may be gathered through one or more sensors associated with the device and/or through inputs received through the device.

Some of the user computing devices 132 may be installed with an application 134 that is developed and operated by the message publisher 120. The application 134 or a portion of it may be developed using a software development kit (SDK) 136 provided by the message management server 110. For example, the application 134 may import the SDK 136 as part of the application 134. At the code level, this may be done by importing one or more libraries of functions and codes of the SDK 136 to the software code of the application 134 in the header section of the software code and having the code calling one or more functions of the SDK 136. While the message publisher 120 primarily operates the application 134, the SDK 136 allows the user computing device 132 to communicate with the message management server 110. For example, an example message publisher 120 may be a retail business that develops an application 134 for its customers to purchase items through the application 134. A customer may opt-in to allow the application 134 to track certain analytics. The analytics may be forwarded to the message management server 110 through the SDK 136. In another example, the message management server 110 may send in-application messages (in-app messages) to the message recipient 130 through the SDK 136.

Upon the receipt of the message, the SDK 136 forwards the message to the software application for the message to be displayed in the application 134.

The SDK 136 may include a live chat feature that provides a platform for the message recipient 130 to instantly communicate with an agent of the message publisher 120. The live chat feature may be an in-application (in-app) feature that is built as part of the native feature of an application 134. The live chat feature may also be a stand-alone feature that operates independently as a separate application 134. The live chat feature may be an example of messaging platform 142. The live chat feature may be launched as part of the native feature of an application 134. Alternatively, or additionally, the live chat feature may be launched through one or more deep link that brings the user clicking the link directly to the particular feature of an application 134. For example, using a deep link, a live chat messaging platform may be launched.

The application 134 may run on Swift for iOS and other APPLE operating systems or on Java or another suitable language for ANDROID systems. In another case, an application 134 may be a software program that operates on a desktop computer that runs on an operating system such as LINUX, MICROSOFT WINDOWS, MAC OS, or CHROME OS. A user computing device 132 may be installed with different applications 134. Each application 134 may be developed by different creators. For example, in some embodiments, a first application 134 is developed by a first message publisher 120 and a second application 134 is developed by a second message publisher 120.

The SDK 136 developed by the message management server 110 may be included by multiple applications 134. For example, multiple message publishers 120 may be customers of the message management server 110 and include the SDK 136 in the applications 134 developed by the message publishers 120, as illustrated in the user computing device A 132A. Each application 134 may communicate to an instance of the SDK 136 through the functions and libraries of the SDK 136 included in the application 134. Each instance of the SDK 136 may be associated with a unique SDK identifier that is used to identify the instance of the SDK 136 in a particular user computing device 132. Each application 134 that includes the SDK 136 may be associated with a unique channel identifier that is used to identify the application 134 by the message management server 110. For example, when a new application 134 is installed in a user computing device 132 and the new application 134 has imported the functionality of the SDK 136, the message management server 110 may assign a new channel identifier for the newly installed application 134. The message management server 110 may send in-app messages to different applications through the SDK 136 by using different channel identifiers.

The message management server 110 may associate end users with SDK identifiers and channel identifiers to identify the applications 134 and the computing devices 132 that are possessed by a particular end user. The identification of the end users may allow the message management server 110 to send cross-channel messages to a particular end user. In some embodiments, when a new application 134 is installed in a user computing device 132, the message management server 110 may associate the new channel identifier with the end user. Based on pre-authorization or upon the user's authorization when prompted, the end user may use the user-specific information and credentials that are saved in the message management server 110 or another source for the new application 134 without having to re-enter the information.

The third-party credential vault 140 may take the form of a server that may be queried through any suitable Internet communication protocols such as APIs. In some cases, the message management server 110 does not store the credentials of end users (e.g., customers of a message publisher 120). Instead, the message publisher 120 may set up with a third-party credential vault 140 to store end users' credentials. Credentials may include user log in information such as account names and passwords. Credentials may also include payment information such as credit card information of the end users stored on file. A message publisher 120 may set up a commerce platform such as a merchant account with a third party, such as SHOPIFY, APPLE PAY, ANDROID PAY, SPREEDLY, etc. Payment information and other credentials of the customers of the message publisher 120 are stored on those third-party systems, which may serve as the message management server 110. The message publisher 120 may authorize the message management server 110 to retrieve information on its behalf. In turn, the message management server 110 sends a query to the third-party credential vault 140 to retrieve information of the end user.

A messaging platform 142 may also be referred to as an instant messaging platform and may provide instant communications between a message recipient 130 and an agent of the message publisher 120. A messaging platform 142 may be a server that provides messaging services to any users. A messaging platform 142 may allow one or more users to participate in any number of conversations with others, such as in the form of private chats, group chat, chatrooms, forums, etc. The conversations between users may take the form of text messages, image messages, voice messages, video conferences, etc. Text messages may include text strings using alphabetical letters, numbers, foreign letters and characters, and other suitable text. Text messages may also include other symbols, graphics, ideograms such as EMOJI, customized image messages, etc. In one embodiment, an instant communication session between a message recipient 130 and an agent may primarily take the form of instant text messages. While instant text message session is used as the primary example in this disclosure, other forms of communication sessions may also be used in a live chat session.

The message management server 110 may monitor a triggering condition to establish an instant interactive communication session between a message recipient 130 and an agent. The instant communication session may also be referred to as a live chat session. The triggering condition may be defined by the message publisher 120 and accepted by the message recipient 130. When the triggering condition is met, the message management server 110 causes a user computing device 132 to prompt a request for the message recipient 130 to accept the instant communication session. Upon acceptance from the message recipient 130, the messaging platform 142 is launched to begin the communication session between the message recipient 130 and the agent.

In various embodiments, the messaging platform 142 may take different forms. In one embodiment, the messaging platform 142 is part of the feature of the SDK 136 and is managed by the message management server 110. For example, a message publisher 120 may publish its own application 134. The application 134 includes the SDK 136 as part of the application. As such, the application 134 will include the messaging platform 142 that is developed and managed by the message management server 110. Another message publisher's application 134, by incorporating the SDK 136, may also include the messaging platform 142 that is operated by the message management server 110. On the other end of the communication session, the agents of the message publisher 120 may log in to the SaaS platform provided by the message management server 110 to access the messaging platform 142. An example interface of the messaging platform 142 is illustrated in FIG. 6.

In some embodiments, the messaging platform 142 may be an independently operated third-party instant messaging platform 142. For example, the instant communication session launched by the message management server 110 may occur at a common messaging platform, such as WHATSAPP, TELEGRAM, SLACK, WECHAT, LINE, FACEBOOK MESSENGER, SNAPCHAT, GOOGLE HANGOUTS, SKYPE, MICROSOFT TEAMS, etc. For example, the third-party instant messaging platform 142 may provide an API that allows the message management server 110 to instantly place a message recipient 130 to a private chat room with an agent of the message publisher 120. As the instant communication session is launched, the message recipient 130 is switched from an application 134 to the messaging platform 142.

A third-party server 144 may be any server that provides notifications to the message management server 110 in order for the message management server 110 to determine whether certain real-life triggering conditions are met. There can be different third-party server 144 in the system environment 100. In a message campaign that is designed by a message publisher 120, the transmission of a message or the performance of an action may be associated with a triggering condition. Some triggering conditions may be associated with an event, such as a real-life event, that is not monitored by the message management server 110. For example, a triggering condition may be the delivery notification of a purchased item. In another example, a triggering condition may be a change of status of a flight. In yet another example, a triggering condition may be a user completing a purchase. In yet another example, a triggering condition may be a guest checking in a hotel. Those events may not be directly performed at the message management server 110. The message management server 110 may receive notifications from one or more third-party server 144 to determine whether some triggering conditions are met.

The networks 160 provide connections to the components of the system environment 100 through one or more subnetworks, which may include any combination of the local area and/or wide area networks, using both wired and/or wireless communication systems. In one embodiment, the networks 160 use standard communications technologies and/or protocols. For example, a network 160 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 160 may be represented using any suitable format, such as hypertext markup language (HTML), extensible markup language (XML), JavaScript object notation (JSON), structured query language (SQL). In some embodiments, all or some of the communication links of a network 160 may be encrypted using any suitable technique or techniques such as secure sockets layer (SSL), transport layer security (TLS), virtual private networks (VPNs), Internet Protocol security (IPsec), etc. The networks 160 also include links and packet switching networks such as the Internet.

The message management server 110 may transmit messages to message recipients 130 via different channels 150. A channel 150 may be associated with a communication protocol or another non-standard method. A channel 150 may also be referred to as a communication channel Examples of channels 150 include text messaging services (e.g., SMS, MMS), emails (e.g., mobile emails, plain text emails, browser emails), push notification protocols (e.g., APPLE push notification, ANDROID push notification), smart home device notification (e.g., voice notification from ALEXA), instant messaging applications (WHATSAPP, WECHAT, TELEGRAM), in-application messages (e.g., messages sent within application 134), social networking systems (e.g., FACEBOOK, TWITTER), RSS feeds, web browser notifications, other suitable protocols such as simply message payloads sent as an Internet packet or a series of packets. The message management server 110 may decide that a message is to be transmitted through one or more channels based on the setting provided by the message publisher 120. The details of the selection of channels will be discussed in further detail below with reference to FIGS. 2 and 3.

A channel 150 may or may not correspond to a user computing device 132. For certain types of channels 150, the user computing device 132 that will receive the message is fixed. For example, for an SMS message, the user computing device 132 that is associated with the phone number will receive the message. An in-application message may also be sent to the user computing device 132 with which the application 134 is installed. A message intended for an IoT device may also be sent using a channel 150 that is associated with the IoT device. Yet, in other cases, the user computing device 132 that is going to receive the message is not fixed. For example, a message recipient 130 may read an email message from more than one user computing device 132.

In some cases, a user computing device 132 may be installed with multiple applications 134 that have included the SDK 136 developed by the message management server 110. In such cases, the SDK 136 has a different channel identifier associated with each application 134. The in-app messages for different applications 134 are considered to be sent via different channels. In some embodiments, an in-app message to a message recipient 130 and the response of the recipient for a particular application 134 may be communicated through a specific application channel that does not cross talk with other in-app messages associated with different applications 134.

Example Message Management Server Components

Figure 2:
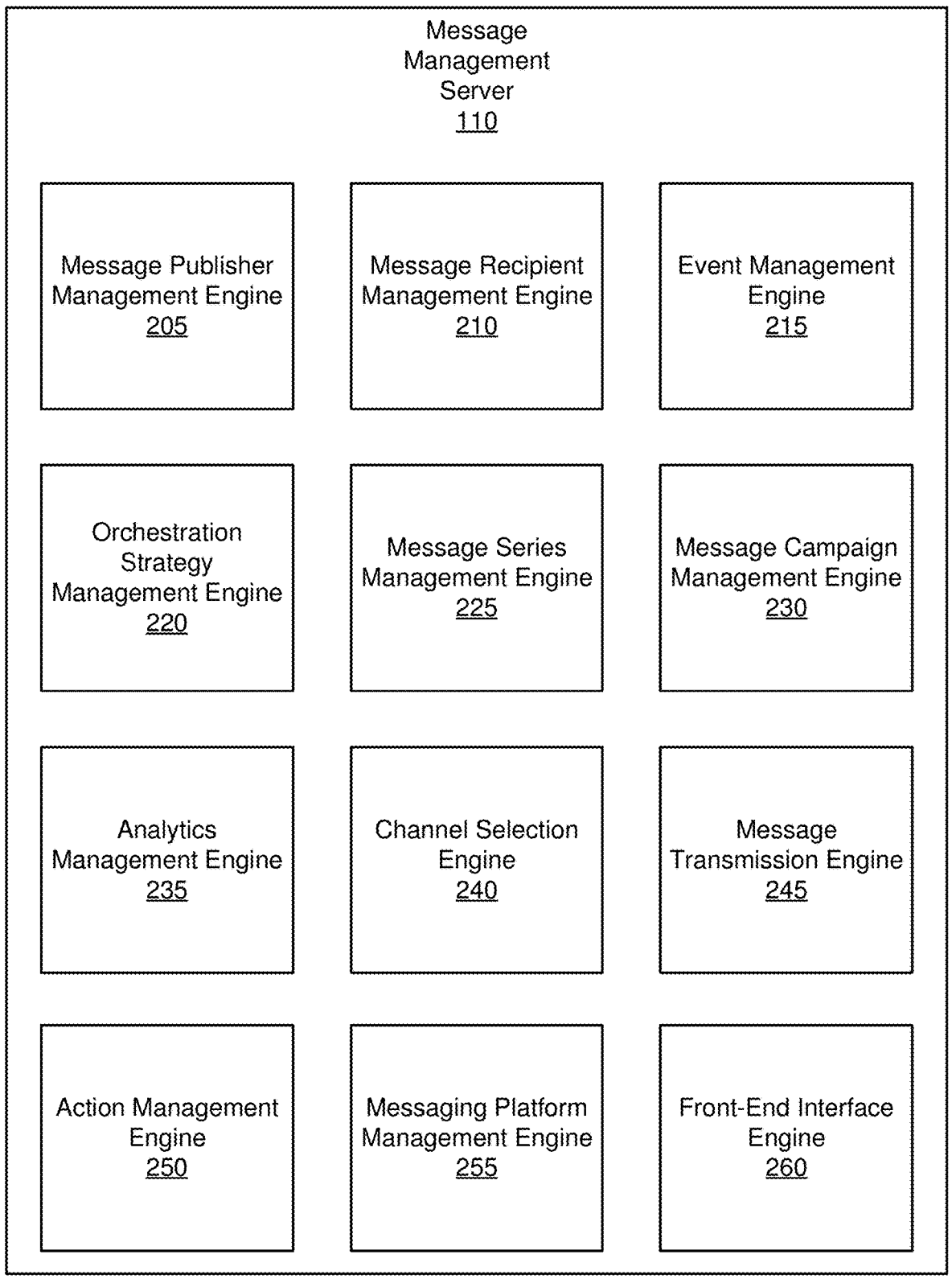
FIG. 2 is a block diagram illustrating various components of an example message management server, in accordance with some embodiments.

FIG. 2 is a block diagram illustrating various components of an example message management server 110, in accordance with some embodiments. A message management server 110 may include a message publisher management engine 205, a message recipient management engine 210, an event management engine 215, an orchestration strategy management engine 220, a message series management engine 225, a message campaign management engine 230, an analytics management engine 235, a channel selection engine 240, a message transmission engine 245, an action management engine 250, a messaging platform management engine 255, and a front-end interface engine 260. In various embodiments, the message management server 110 may include fewer or additional components. The message management server 110 also may include different components. The functions of various components in message management server 110 may be distributed in a different manner than described below. Moreover, while each of the components in FIG. 2 may be described in a singular form, the components may present in plurality.

The components of the message management server 110 may be embodied as software engines that include code (e.g., program code comprised of instructions, machine code, etc.) that is stored on an electronic medium (e.g., memory and/or disk) and executable by a processing system (e.g., one or more processors and/or controllers). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 7.

The message publisher management engine 205 manages the profiles and credentials of message publishers 120 and stores saved templates and saved messages for the retrieval of the message publishers 120. For example, a customer that intends to use the message publisher management engine 205 to launch a message campaign to distribute messages to various end users may create an account with the message management server 110. The message management server 110 stores the customer's profile, metadata, credential and associate the information with a unique customer identifier, such as publisherID. The customer (an example of a message publisher 120) may create message templates, message series templates, digital pass templates (e.g., digital boarding passes and digital coupons), specify criteria of message distribution and goals of message campaigns, select or specify types of events and analytics to be captured by the message management server 110, and configure other settings with the message management server 110. The templates and settings are associated with the customer identifier and can be retrieved, duplicated, edited, and deleted based on the message publisher's preferences and actions entered through a message management application and/or API provided by the message management server 110. The message management application also may enable (or provide for display) one or more graphical user interfaces (GUIs) for rendering on, for example, a user computing device 132. Examples of GUIs of the message management application will be discussed in further detail with reference to FIGS. 5 and 6.

By way of example, the message publisher management engine 205 may include a message publisher profile database, which may also store information including filter preferences, event types, message publisher server destination, and predictive and automation settings for registered users. In other embodiments, the message publisher account database may also store additional services that a message publisher 120 would like to interface with, including the number of active streams associated with the message publisher 120. For example, these additional services can be other message publishers and/or strategic partners. Continuing with the example, a message publisher 120 may optionally choose to create three active streams. One stream may be associated with a server configured to receive a stream generated associated with a message publisher 120 at a specific server destination, e.g., www.foo.com, another with a server associated with a social media system, e.g., FACEBOOK, TWITTER, PINTEREST, etc., and the last with a server associated with a message publisher organization. In some example cases, the preferences associated with a message publisher profile may be a username and/or destination address. The message management server 110 may also be configured to accept additional message publisher preferences. This additional message publisher information may capture targeted demographics information, spending habits, travel habits, and other such details.

In some embodiments, the message publisher management engine 205 may also store credentials or access keys of message publishers 120 for third-party systems such as the third-party credential vault 140. For example, a message publisher 120 may have set up a retail platform or a merchant system with the third-party credential vault 140. The third-party credential vault 140 may stores information such as payment information of end users (e.g., the customers of the message publisher 120). The message publisher 120 may provide the message management server 110 an access key, such as an API access key with a particular level of access privilege, for the message management server 110 to query the third-party system, such as the third-party credential vault 140, to retrieve information of the end users.

The message recipient management engine 210 manages the message recipients 130 to whom the messages are sent. A message publisher 120 may specify a set of intended message recipients 130. A message recipient 130 may be associated with a recipient identifier, recipientID. Depending on whether a message recipient 130 is identified as possessing a user computing device 132, applications 134, and/or SDK 136, the message recipient management engine 210 may also associate the recipienID with one or more device identifier, application identifier (which may be in the form of channel identifier), and SDK identifier. For example, each user computing device 132 associated with the message recipient 130 may be associated with a device identifier, deviceID. For some devices, the message recipient management engine 210 may also store application identifier, applicationID, for identifying actions occurred at or related to an application 134 and track in-application messages sent through the application 134. A set of recipientIDs, deviceIDs, and applicationIDs may be associated with a publisherID.

The message recipient management engine 210 may maintain metadata tags for message recipients 130. For metadata tags may include information such as whether a recipient is a natural person or not, preferences of the message recipients 130, opt-in or opt-out options of the message recipients 130 (e.g., a message recipient may opt-out for receiving a message from a particular channel), and other characteristics of the message recipients, including consented information such as gender, age, interested products, interested news, etc. Based on the characteristics of the message recipients 130, the message recipient management engine 210 may categorize the message recipients into one or more groups. The message recipient management engine 210 may also store records of messages sent to each message recipient 130, such as metadata of the messages (e.g., date and time of the messages, the channel identifier, channelID, used to send a particular message), the payloads of the messages, actions taken or related to each sent message, and types of devices and deviceIDs to which the message are sent.

The event management engine 215 manages and stores events associated with message recipients 130, user computing devices 132, or applications 134. The events may be associated with one or more triggering conditions of a message campaign. The events may be transmitted from the message publishers 120, from third parties such as a third-party server 144, or from the user computing devices 132.

Events transmitted from the message publishers 120 or third parties may trigger the distribution of one or more messages or performance of an action by the message management server 110 to different message recipients 130. By way of example, a message publisher 120 may be an airline that transmits an event notification to the message management server 110 that a flight is delayed and identifies the passengers of the flight based on the recipientIDs. Based on the event notification, the message management server 110 may send a message to the passengers. In another example, a message publisher 120 may be a bank that sends an event notification to the message management server 110 that an end user has settled a transaction. Based on the event notification, the message management server 110 sends a confirmation message to the end user. In yet another example, the event may be transmitted from a third party. The message management server 110 may identify message recipients 130 that are potentially affected by the event notified by the third party. Various real-life events may be the triggering conditions of one or more messages or actions. The notifications of those real-life events may be transmitted from message publishers 120 or third-party server 144.

The events may also be sent from various user computing devices 132 associated with message recipients 130. Those event notifications may be referred to as mobile event notifications. Each mobile event notification may be associated with a message recipient 130 and be saved along with an event identifier, eventID, a messageID and a recipientID. Mobile event notifications may be transmitted from mobile event sources. In various embodiments, a mobile event source may be an IoT device or a user computing device 132 running an application 134. The application 134 is configured to generate and transmit a mobile event notification. For example, the SDK 136 may include code instructions to cause a user computing device 132 to transmit a mobile event notification to the message management server 110. A mobile event notification may be related to a user computing device 132 or may be specific to a particular application 134 that is in communication with the SDK 136.

A mobile event notification from a user computing device 132 may include a notification payload and a destination associated with a message publisher 120. In various embodiments, the destination is a network address such as a message publisher computer, a proxy server, or another device configured to receive data streams from message management server 110. For example, the destination may be a specified universal resource locator (URL), e.g., "www.message publisher.com/proxyserver". The notification payload associated with a mobile event notification, received by message management server 110, may include an event descriptor and a notification identifier.

The event descriptor may include at least one of an application lifecycle event, a user engagement event, a user behavior event, a user insight event, a user location event, or any combination thereof. In one example, an event descriptor is an application lifecycle event such as a "first open" of an application 134, an "inactivity" event (e.g., an application 134 has been inactive), an "app open" event, an "app close" event, or an "app uninstall" event; a user engagement event such as a "push", a "push send", a "rich deliver", a "rich read", a "rich delete", an "in application display", a "digital pass object install" or a "digital pass object remove"; a user behavior event such as a "tag update" event, an "app open" event, an "app close" event, or other custom events defined by a message publisher 120. In some embodiments, the event descriptor may also include a user location event such as geolocation, or timestamp data or a user insight event associated with a prediction of a future application lifecycle event, user engagement event, user behavior event, user location event, or any combination thereof. For the ease of reference, all those events, whether they are related to application lifecycle, user engagement, location, or timestamp, may be collectively referred to application lifecycle events.

By way of example of a mobile event notification, a user computing device 132 (e.g., a mobile phone, an IoT device) sends a mobile event notification to message management server 110 if the user computing device 132 is within a threshold distance of a store of a message publisher 120, or if the user opens the application 134 or interacts with an IoT device.

A notification identifier may include an identification of the notification and other identification information. For example, the identification may include a userID, an applicationID, a message publisherID, a deviceID, deviceType, or any combination thereof. For example, a mobile event notification generated by a user computing device 132 associated with a user "Nolan" may include a message that a user associated with userID: "Nolan", a deviceID: "02", an event descriptor: "app uninstall" associated with a message publisherID: LATTE, INC., at Time: 11:00 PM PST near a location of 123 Main Street, Portland, Oregon.

In some embodiments, a mobile event source is an IoT device associated with a message publisher 120. An IoT device may be configured to transmit a mobile event notification to message management server 110. For example, an IoT device may be a temperature sensor that generates a mobile event notification with the current temperature and transmits the generated mobile event notification to the message management server 110 via network 160.

In some embodiments, upon receiving a mobile event notification from a user computing device 132, the event management engine 215 generates a mobile event token. The mobile event token may be derived (e.g., a hash) in some way from the received mobile event notification and/or metadata relating thereto. In some embodiments, a single mobile event token is assigned to a plurality of received mobile event notifications. Additionally, as used herein, the process of generating a mobile event token from a mobile event notification may be referred to as "decorating a received mobile event notification" and can be used to provide context to mobile event notifications received from a user computing device 132.

In some embodiments, the event management engine 215 may generate the mobile event token by communicating with a number of contextual services. The event management engine 215 may include code segments for generating a mobile event token including assigning context obtained from one or more contextual services. Contextual services may further include any number of modules that extract timestamp data, demographic data associated with a user, GPS data, historical data including historical trends, or any combination thereof from a received mobile event notification. For example, upon receiving a mobile event notification associated with an "app open" event from a user computing device 132, the event management engine 215 generates a mobile event token including a timestamp and a GPS location associated with the received event. In other embodiments, the contextual data assigned to a mobile event token associated with a mobile event notification may be associated with a certain user computing device 132 including one or more identifiers. In still other embodiments, the message management server 110 may decorate a mobile event token with a predicted user behavior including a future user engagement event, an application lifecycle event, or any combination thereof. U.S. Pat. No. 10,567,536, entitled "Mobile Event Notification for Network Enabled Objects," patented on Feb. 18, 2020, is hereby incorporated by reference for all purposes.

The orchestration strategy management engine 220 stores strategies and rules provided by message publishers 120 for the transmission of messages to various message recipients 130. In some message campaigns, the same message may be sent to a message recipient 130 through multiple channels 150 or a series of related messages may be sent to the message recipient 130 through different channels 150. The transmission of messages through different channels 150 may be referred to as channel orchestration. For example, a message publisher 120 may set up a message series for a payment reminder. The first reminder message may be sent through a less disruptive channel 150 such as by an email. Subsequent reminder messages may be sent through more disruptive channels 150 such as a push notification, an in-application notification, and an SMS message.

The orchestration strategy management engine 220 may allow a message publisher 120 to pick different channel selection rules for each message or a series of messages. Example channel selection rules may include channel priority with fall back, last active, originating channel, and fan out option. When the message management server 110 sends a message to a message recipient 130, the message management server 110 selects one or more channels 150 based on the channel selection rules associated with the message.

A channel selection rule for channel priority with fall back allows a message publisher 120 to select the priority of the channels to send a message and select fall back channels if a higher-priority channel(s) is not available. A channel selection rule may be applicable to a large group of message recipients 130. The message recipient management engine 210 may provide a list of available channels 150 (e g, channels that are opted in, or not opted out) for each intended message recipient 130. Each intended message recipient 130 may be associated with a different list of available channels 150. The message management server 110 attempts to send the message to the highest priority channel first and fallbacks to alternative channels if a message recipient 130 does not opt in for the highest priority channel.

The channel selection rule for the last active channel or the originating channel specifies that the message management server 110 sends a message based on the message recipient's last active channel or the originating channel. The event management engine 215 may provide mobile event notifications that include information on whether a user has taken an action (e.g., opening a message, responding to an email, etc.) with respect to a channel 150. If the user takes an action that triggers the message management server 110 to send another message, the new message may be sent to the same channel. This reaction by the message management server 110 may be selected by the originating channel selection rule. The originating channel selection rule may also specify that the message management server 110 to target a channel 150 associated with a trigger event. For example, the message publisher 120 may direct the message management server 110 to send a message when a trigger event is detected from a channel 150 or associated with an application related to a channel 150. For example, a message publisher 120 may specify that a new message is to be sent when a location event is detected (e.g., a device enter a radius or a territory of a location). The location event may be sent from an application 134. The message management server 110 may send the new message through an in-application message or a push notification associated with the application 134.

The channel selection rule for fan-out specifies that the message management server 110 to send the same message to a message recipient 130 through multiple channels 150 simultaneously or within a reasonable timeframe. A message publisher 120 may select multiple channels 150 for the fan-out option. For a specific message recipient 130, the message management server 110 sends the message through various channels 150 unless one or more channels are opted-out by the message recipient 130.

The message series management engine 225 allows message publishers 120 to design a message series. Each message series may be referred to as a journey. A message series may include a series of related messages that are sent to a message recipient 130 when a certain condition is met. The message series management engine 225 manages the message series that is designed and saved by various message publishers 120. A message series may be associated with a start condition, an end condition, message recipient selection criteria, a message order, message branching, and triggering conditions and channels 150 to be used for each message in the series. A message series may also include one or more actions that can be performed by the message management server 110 when certain triggering conditions are met. For example, the message publisher 120 who designs the message series may specify certain points in the message series where a live chat options are available for the message recipients 130. If the message series reaches those points and a message recipient 130 opts to start a live chat, the message management server 110 performs an action to launch an instant communication session to connect the message recipient 130 to an agent. The agent may be an employee of a message publisher 120 or an independent agent.

A start condition of a message series may include various rules that specify when a message series will be triggered for a particular candidate message recipient 130. A triggering condition may be an event, such as a mobile event when the message management server 110 receives a mobile event notification. For example, a message series may be triggered when a user first opens the application 134. A triggering condition may also be another event whose notification is provided the message publisher 120 or a third party. For example, a message series may begin 24 hours after a user has created an account with the message publisher 120. Other triggering conditions may include tag change, inactivity, first seen, location matching, location attributes, and an event occurring. The start condition may also include timing and date for the first message in the message series to be sent after a triggering condition is met. In some cases, the message series starts immediately after a triggering condition is met. In other cases, the message series is scheduled based on the timing and date. The start condition may also include certain limitations. For example, the limitation may prevent the message management server 110 from involving a message recipient 130 in more than a certain number of message journeys within a predetermined period of time. The limitation may also prevent the message management server 110 from involving a message recipient 130 in a repeated message journey. A triggering condition may also be a risk factor such as a churn risk associated with an application 134 or a channel 150.

An end condition may include various rules that specify when a message series is completed. A message publisher 120 may specify that a message series is completed after all messages in the series are sent. Other end condition examples may specify rules for a message series to end prematurely. For example, a message series may end on a conversion event or a cancellation event. A conversion event is associated with a conversion condition. The message management server 110 may exit a message recipient 130 when the conversion event is detected. For example, in a marketing campaign, when a message recipient 130 clicks on an advertisement that is sent as a message, the message publisher 120 may specify that the clicking of the advertisement is a successful conversion. In another example, if the message series is for reminding a user to make a monthly payment, the conversion event may be that the user has made the monthly payment. A cancellation event may be an event that is indicated by the message recipient 130 or the message publisher 120 to stop the message series when the cancellation event is detected. For example, a message recipient 130 may want to opt-out or unsubscribe from the message series.

The message recipient selection criteria allow a message publisher 120 to select what users will be selected for a particular message series. The selection criteria could be event-based, metadata tag-based, device-type-based, channel-based, or any combination thereof.

The message order and message branching allow a message publisher 120 to select how the messages in a series are arranged. A message series can be linear or can be branched. The message publisher 120 may also specify conditions to skip one or more messages.

The triggering conditions and channels 150 to be used for each message in the series are rules that are specified by a message publisher 120 how when a message will be sent after one or conditions are met. The triggering condition for a message may be time-based. For example, a second message may be sent 2 days after the first message is sent. The triggering condition for a message may also be event-based, such as when the message management server 110 receives a mobile event notification that matches the triggering condition. The event-based triggering condition may also include a time element such as a delay after the event condition is met. Other triggering conditions discussed in this disclosure are also possible. For each message, a message publisher 120 may also select a channel selection rule based on the discussion above with reference to the orchestration strategy management engine 220.

The message campaign management engine 230 manages message campaigns designed by various message publishers 120. A message campaign may be a goal-based collection of multiple related message series. For example, a message publisher 120 may design a goal-to-goal branching of multiple message series. Each message series may have a goal that is specified in the end condition of message series. The message series are linked together in any suitable ways, branched or linear, cyclic or acyclic. A message campaign may also be referred to as a primary message plan.

The selection of message series in a message campaign may depend on the recipient's response in one or more two-way message series. For example, in a re-engagement campaign, the message management server 110 may determine that the recipient did not provide a response to messages that are sent in one of the series. A chunk model may be to determine a threshold level of whether a particular end user has churned with respect to the usage of an application 134. In turn, the message management server 110 may select message series that include communications in other channels to attract the end user to re-engage with the application 134. In another example, an end user may provide a response in a two-way messaging series. Based on the type of response and the goal specified by the message publisher 120 when designing the message campaign, the message management server 110 may select different subsequent message series to be sent to the recipient 130.

The analytics management engine 235 provides statistics and analytics for messages, message series and message campaigns. After messages are sent to message recipients 130, the message management server 110 may receive responses from the message recipients 130, mobile event notifications, or other notifications related to the messages. For some of the messages, the message management server 110 may also receive no action from the recipients or any notification at all. A message management server 110 may keep track of the number of users in each message series, actions taken by the users (or inactions) after receiving messages, and other metrics such as rates of meeting certain triggering criteria. A message publisher 120 may start a message series or a message campaign in real-time. The message management server 110 may display how many users (message recipients 130) are in each message series and other live analytics in real-time for each message or each message series as a summary of the progress of each message series. The analytics management engine 235 may also provide statistics related to commercial activities in a message series. For example, in a two-way message series, recipients 130 may make various in-app purchases. The analytics management engine 235 may provide a conversion rate of the message series for messages sent that resulted in one or more purchases.

The channel selection engine 240 selects one or more channels 150 for transmitting or distributing a message. The channel section engine 240 may select the channels 150 based on the channel selection rules specified by the message publisher 120 as discussed in the orchestration strategy management engine 220. The channel selection engine 240 may also perform a channel retargeting operation. The message management server 110 may monitor events such as user behaviors in one channel 150 and decide to send follow-up messages in a message series to the users on a different channel. For example, the message management server 110 may determine an application churn risk with respect to a user. In response to the churn risk being higher than a threshold, the message management server 110 may decide to change an in-application message to another channel that is less reliant on the application (e.g., an email channel). The message management server 110 may monitor the interaction or lack of action of the users with one or more messages to determine whether the user receives messages on alternative channels. The message management server 110 may switch from a channel 150 that is tied to one or more applications (e.g., push notification, in-application message, web notification, instant messages in a chat application) to another channel 150 that is more independent. U.S. patent application Ser. No. 15/646,008, entitled "Churn Prediction with Machine Learning," filed on Jul. 10, 2017, is incorporated by reference for all purposes.

The message transmission engine 245 formats messages in appropriate forms, applies certain communication protocols and transmits the messages to message recipients 130. In some embodiments, the message transmission engine 245 may receive text and images of a message payload from a message publisher 120. For example, the message publisher 120 may design a message using an application provided by the message management server 110. Certain message channels and user computing devices 132 may require a message format in order for the message to be transmitted. For example, an SMS message may not contain an image. The format of a push notification may depend on the operating system of the user computing device 132. The appearances of certain messages may also be affected by the display resolution of the user computing devices 132. The message transmission engine 245 may package a message payload based on the selected channel. The message transmission engine 245 may convert the payload to an appropriate format that is compatible with a message channel, such as JSON, XML, key-value pairs, HTML, etc. Certain channels may also be associated with specific communication protocols. For example, emails may use standard mail protocols, such as Simple Mail Transfer Protocol (SMTP). A message may also need certain headers to be transmitted. The message transmission engine 245 may generate the message payload and convert the payload to one or more network packets to be sent to the message recipients 130.

The message transmission engine 245 may also check rules and timing that may restrict the transmission of a message to a specific message recipient 130. For example, a message publisher 120 or a message recipient 130 may restrict the timing for transmitting certain messages (e.g., a do-not-disturb period). There may also be other rules that restrict the transmission of messages to certain recipients 130. The transmission of message may also be subject to one or more privacy settings of the end users, such as options that limit the channels used, options that limit tracking of data and usage, types of messages that are authorized to be sent, subscription and unsubscribe options, etc.

The action management engine 250 manages one or more actions that may be taken by message management server 110 in a message series. A message publisher 120 may decide that, at a certain point of a message series, action will be performed when a triggering condition is met. An action may cause a user computing device 132 possessed by the message recipient 130 to perform certain things. For example, an action may cause an application 134 to perform certain actions. The message management server 110 may generate a command to the SDK 136 and, in turn, the SDK 136 causes the application to perform the action. An action may be taken in place of or in addition to sending a message to the message recipient 130. For example, a message may include an object (e.g., hyperlink, program object, content object) that will cause the application 134 to perform an action. Examples of actions include opening the home screen of an application 134, sending users to a message center, opening an HTML landing page within an application 134, opening a configured screen within an application 134 through a deep link, using an adaptive link to move to a mobile wallet pass, opening a web page in a browser, prompting a user to share certain information or message on one or more social networks, and launching an instant communication session such as a live chat session.

The messaging platform management engine 255 manages the launching of a messaging platform 142 and, in the embodiments where the message management server 110 operates the messaging platform, manages and provides various features for the messaging platform 142. In some embodiments, the messaging platform management engine 255 establishes a connection between a user (e.g., a message recipient 130) and an agent in an instant communication session. The instant messages between the user and the agent may be transmitted through the message management server 110. For example, in one embodiment, the messaging platform 142 is a chat feature in an application 134 that is powered by the SDK 136. The user may enter a chat with the agent inside the application 134. The chats are transmitted to the message management server 110 via the SDK 136. In turn, the message management server 110 forwards the chats to the agent. In some embodiments, the messaging platform management engine 255 may save a copy of the chats for the record. The agent may be able to see past chats to better serve the user.

The messaging platform management engine 255 may also provide the messaging platform on the side managed by the message publisher 120. The message publisher 120 may use the message management server 110 to distribute a message series to various end users. The end users may opt in to have a live chat with the message publisher 120 to chat about the products, services, and/or applications 132 offered by the message publisher 120. The message publisher 120 may retain one or more natural person agents to engage in live chats with various users. The messaging platform management engine 255 may provide the messaging platform interface to the message publisher 120. Agents of the message publisher 120 may log in to the messaging platform 142 that is operated by the message management server 110. The messaging platform management engine 255 manages various features such as routing a chat session to an appropriate agent. For example, in one embodiment, the routing may be based on the first available agent or the most available agent. In some embodiments, the routing may also be used on the identity of the user, the nature of a transaction, or a message series associated with the live chat. For example, instead of using a team of customer service specialists to handle the live chat, a business may opt to connect the live chat sessions to the salespersons who are responsible for the customers or the transactions. In some embodiments, the live chat is launched as part of an action of a message series. The identifier of the message series and the identifier of the message recipient 130 may be used to determine the agent who will be connected to the live chat. In such cases, a customer may directly be connected to the right sales team in the live chat session.

The messaging platform management engine 255 may also allow the agents to manage various preferences associated with the messaging platform 142. For example, an agent may specify different kinds of automatic responses or automatic first responses. The transmissions of those responses are selectable by the agent based on date, time and other suitable conditions. The agent may also specify an out-of-office message, the working hours, and the off hours. Other settings that may be personalized by an agent may include modes of operation of the messaging platform 142 and message templates that can be used by the agent to generate various prefilled form responses.

The messaging platform management engine 255 may also provide metadata and other information associated with an instant communication session. For example, the agent may be provided with information such as past live chat sessions with the message recipient 130 who is on the live chat, action history of the message recipient, last channel of communication with the message recipient 130, and other suitable metrics. In some embodiments, the instant communication session may be launched as part of an action associated with a message series. The messaging platform management engine 255 may also provide information regarding the message series, such as the precise message or triggering condition that causes the live chat. The information may be presented to the agent for review.

Figure 5A:
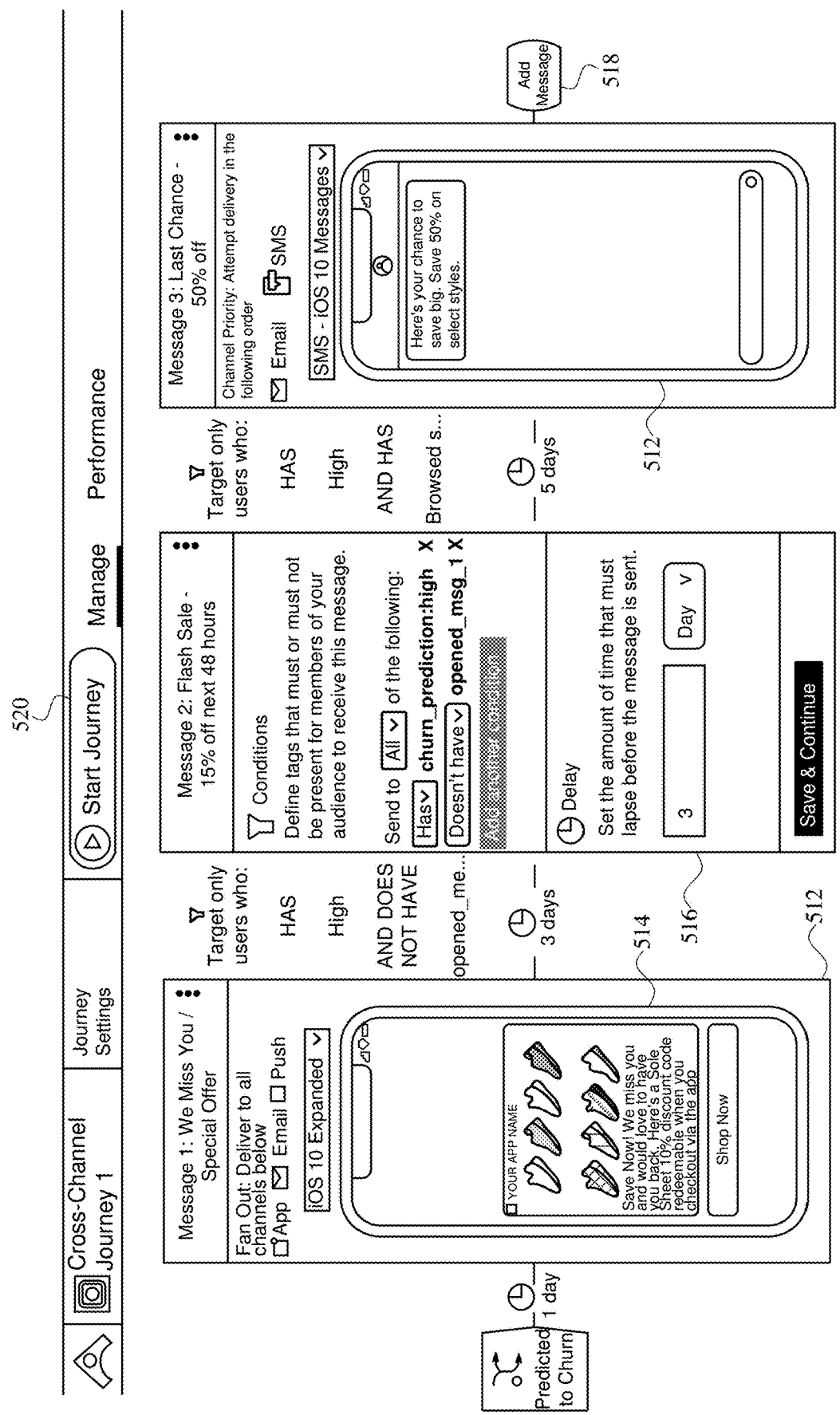
FIG. 5A is a conceptual diagram illustrating an example graphical user interface (GUI) that includes the message series preview, in accordance with some embodiments.

The front-end interface engine 260 provides one or more software application interfaces that are operated by the message management server 110. For example, the message management server 110 may provide a message building software system (e.g., a SaaS platform) for message publishers 120 to design and manage various messages, message series, and message campaigns. In another example, the message management server 110 may also provide a messaging platform 142 for agents of message publishers 120 to perform live chat with various users. In some embodiments, the message building system and the messaging platform are part of the same SaaS platform. Examples of the GUI elements of a message building system and a messaging platform 142 are shown in FIG. 5A through FIG. 6. The application provided by the message management server 110 may be distinguished from the application 134 shown in FIG. 1. The application provided by the message management server 110 may be an application for message publishers 120 to manage their message campaigns. In contrast, the application 134 may be provided by a message publisher 120 for its end users. For example, the application 134 may be a software application provided by a retail business for which users can purchase items and manage coupons. The application provided by the message management server 110 provides a management platform (e.g., SaaS platform) for the retail business to manage its message campaigns, such as promotional and marketing message, and to establish live chat sessions with its users.

The interfaces provided by front-end interface engine 260 may take different forms. In one embodiment, the front-end interface engine 260 may control or in communication with an application that is installed in a client device 125. For example, the application may be a cloud-based SaaS or a software application that can be downloaded in an application store (e.g., APPLE APP STORE, ANDROID STORE). The front-end interface engine 260 may provide a front-end software application that can be installed, run, and/or displayed at a client device 125. The front-end interface engine 260 may also provide an interface that may take the form of a webpage interface of the message management server 110 to allow message publishers 120 to access data and results through web browsers. In another embodiment, an interface may not include graphical elements but may provide other ways to communicate with message publishers 120, such as through APIs. The API may be in compliance with any common API standards such as Representational State Transfer (REST), query-based API, Webhooks, etc. The data transferred through the API may be in formats such as JSON and XML.

Example Message Object Hierarchy

Figure 3:
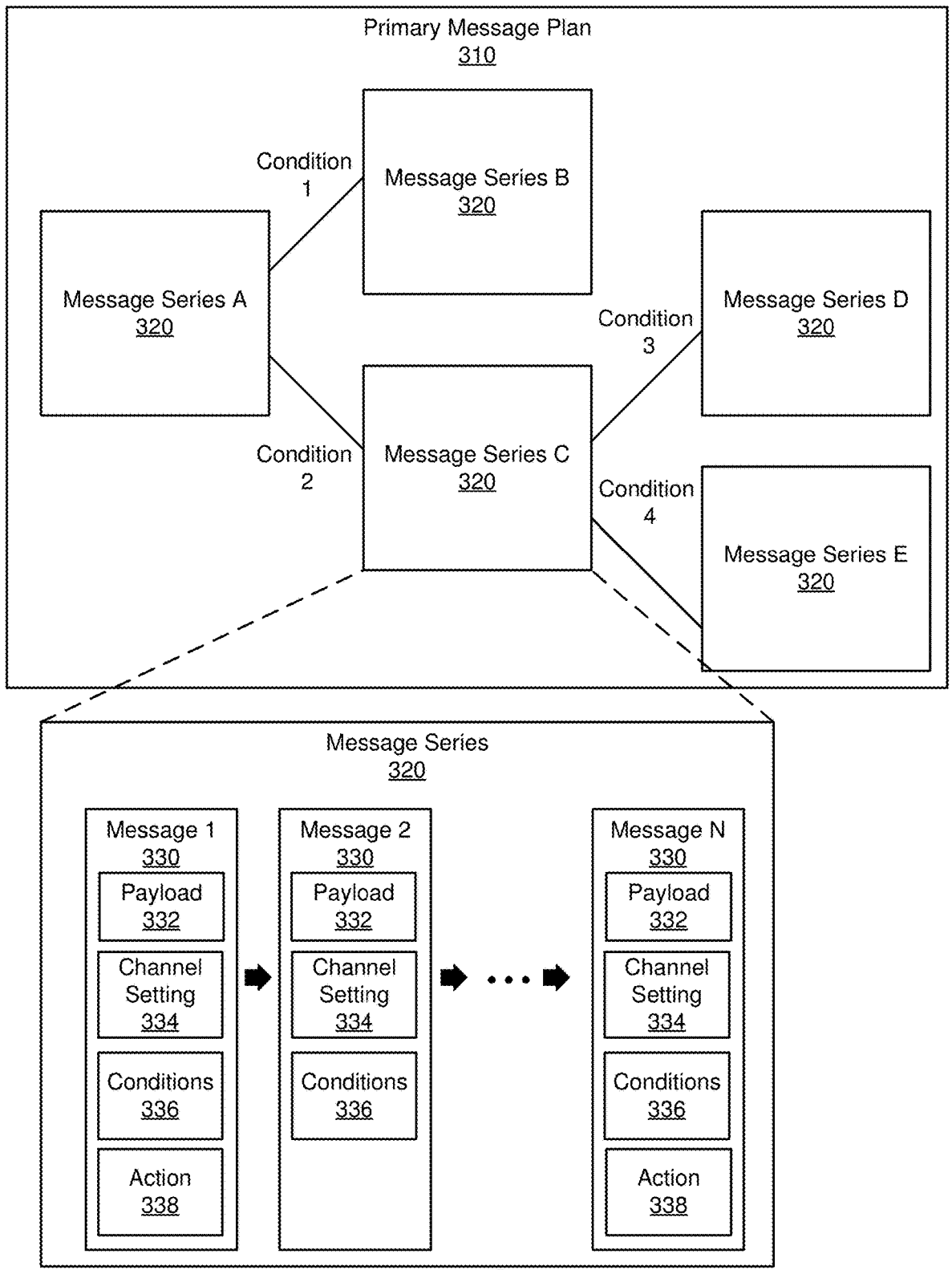
FIG. 3 is a block diagram illustrating an example message object hierarchy that may be used with the message management server, in accordance with some embodiments.

FIG. 3 is a block diagram illustrating an example message object hierarchy that may be used with the message management server 110, in accordance with some embodiments. A primary message plan 310 may include multiple series 320. The primary message plan 310 may also be referred to as a message campaign. Each message series 320 may be referred to as a message journey. Each message series 320 may include one or more messages.

The message series 320 in the primary message plan 310 may be connected in any suitable ways, branched or linear, cyclic or acyclic. The primary message plan 310 may be associated with a set of target recipient criteria that specify which candidate message recipients 130 may enter the message campaign associated with the primary message plan 310. The selection criteria may also be the triggering condition of the first message series A in the primary message plan 310. For example, a candidate message recipient 130 who meets the triggering condition of the first message series A will receive the first message in the message series A and be enrolled in the primary message plan 310. Each message series 320 may be associated with an end condition that is discussed above with reference to the message series management engine 225 in FIG. 2. In some embodiments, a message series 320 may include two or more alternative end conditions, such as the condition 1 and the condition 2 shown in FIG. 3. The message management server 110 may enroll the message recipient 130 to another message series based on the fulfillment of one of the alternative conditions. In some embodiments, except the first message series A, other message series' start condition may be the end condition of the preceding message series based on the branching and connections among the message series 320.

The end condition of a message series 320 may be a goal of the message series 320. For example, the goal of sending a series of messages to a message recipient 130 may be to induce the recipient to perform a certain action. The message management server 110 may receive event notification from a user computing device 132 or from the message publisher 120. The action of the message recipient 130 meeting the end condition of a message series 320 may be a goal of the message series 320. The inaction of the message recipient 130 may be end condition of the same message series 320. Based on the end condition, the message recipient 130 is routed to another succeeding message series 320. Based on the end conditions of various message series 320, the primary message plan 310 provides a goal-to-goal branching of message series 320.

Each message series 320 may include one or more messages 330 that may be connected in any suitable ways, branched or linear, cyclic or acyclic. A message publisher 120 may arrange the order and branching of the messages 330 and compose each message 330. The message publisher 120 may design the payload 332, the channel setting 334, the conditions 336 triggering a specific message, and an action 338 associated with a message 330. The message payload 332 may include text, image contents, and multimedia contents such as voice, videos, and music. The channel setting 334 may be based on the channel selection rules as discussed above with reference to the orchestration strategy management engine 220. The message publisher 120 may also specify criteria related to channel retargeting or allow the message management server 110 to automatically perform the channel retargeting. The message publishers 120 may also specify the conditions 336 for triggering a message 330 to be sent. The conditions 336 may specify that a succeeding message is sent automatically or after a time delay. The conditions 336 may also specify a mobile event notification for the triggering of a special message. A message 330 may be skipped if the conditions 336 are not met. Other possible conditions are discussed above with reference to the message series management engine 225.

In a message series 320, one or more conditions may include responses from the message recipient so that the message series 320 is an example of two-way messaging series. The message management server 110 may perform an action based on the response. For example, the message publisher 120 may design a message series that classifies possible responses into various categories. The message publisher 120 may define the action for each category. For example, for a response that specifies a purchase action, the message series 320 may include a condition that directs the message management server 110 to complete the purchase transaction. For another response that specifies the end user's interest in a particular product item, the message series 320 may include a branch of subsequent messages that are to be sent to the message recipients to further promote the product item.

A message 330 may be associated with an action 338. Examples of actions are discussed above with reference to an action management engine 250. An action 338 may be associated with its own triggering condition 336, which may be the same or different from the message 330. In a message series 320, some messages 330 may be associated with an action 338 while other messages 330 may not include an action 338. For example, a message 330 may include a deep link that causes an action of opening a configured screen of an application 134. In some embodiments, based on the conditions of one or more messages 330, the action 338 may be the launching of a live chat session. While each action 338 in FIG. 3 are illustrated as being associated with a message 330, in some embodiment an action 338 may also be a standalone part of a message series. A message publisher 120 can design a message series with an action 338 that is not associated with any message. For example, the standalone message may be between message 1 and message 2 in FIG. 3 and has its own triggering conditions.

While a message series 320 in FIG. 3 is illustrated as having multiple messages, in some embodiments, a message series 320 may also include a single message or a single action. A message publisher 120 may create an automation flow to transmit a message or perform an action upon the detection of one or more triggering conditions.

Example Instant Communication Launch Process

Figure 4A:
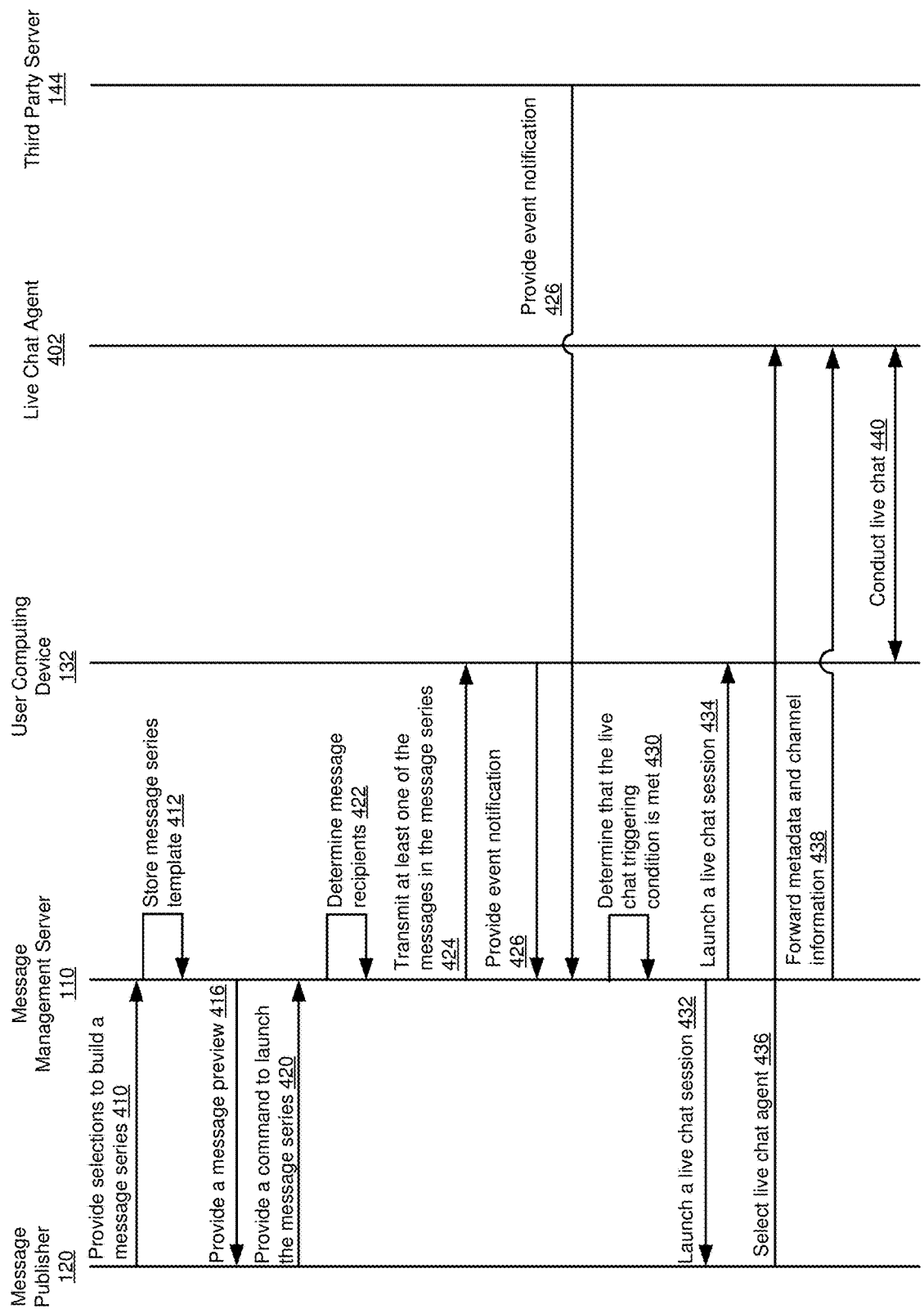
FIG. 4A is a flowchart depicting an example process for the message management server to launch an interactive communication session, in accordance with some embodiments.
Figure 4B:
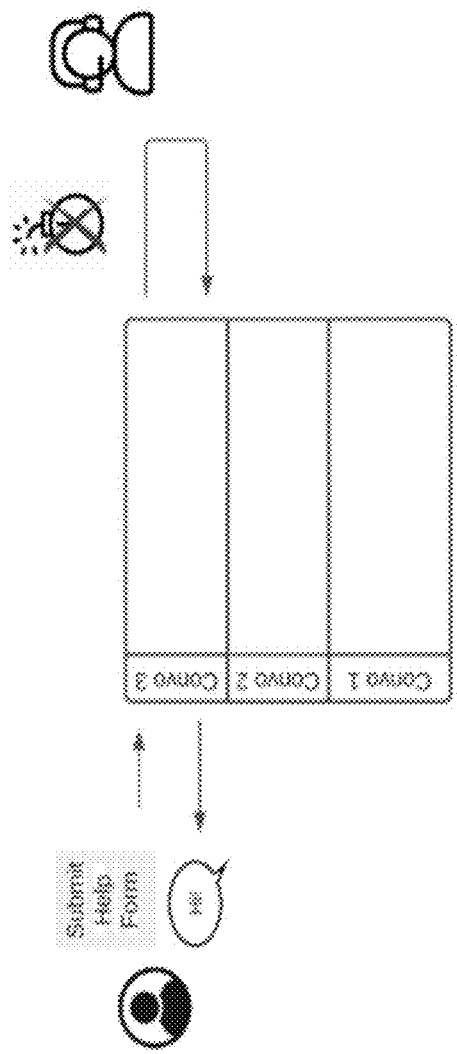
FIG. 4B is a conceptual diagram illustrating how an example live chat session may be generated based on responses of a user in a survey form, in accordance with some embodiments.

FIG. 4A is a flowchart depicting an example process 400 for the message management server 110 to launch an interactive communication session, in accordance with some embodiments. The steps associated with one or more devices (e.g., device associated with the message publisher 120, the message management server 110, the user computing device 132, the device associated with a live chat agent 402) in the process 400 may represent specific sets of instructions that may be stored in one or more computer-readable media, such as memory. The instructions, when executed by one or more processors, cause the processors to perform one or more computer-implemented processes. For example, specific steps associated with the message management server 110 may represent a set of instructions executable by the message management server 110 to launch a live chat session associated with a message series. In various embodiments, one or more steps may be added, deleted or changed in the process 400.

A message publisher 120, which may be a customer that uses the service provided by the message management server 110, may provide 410 selections to build a message series. The selections may be inputted through a graphical user interface (GUI) provided by the message management server 110. For example, the GUI may be part of the message management server's SaaS platform for the message publisher 120 to build various automation, message series and campaign. The GUI may include control elements, which may be arranged in a sequence such as a wizard, to allow the message publisher 120 to build a message series. Examples of various views of the GUI are illustrated in FIG. 5A through FIG. 5D. The message management server 110 receives the selections from the message publisher 120 to build the message series. The message series may be defined by a series of rules and logic for the message management server 110 to automatically transmit one or more messages to a plurality of target end users (target message recipients) on behalf of the message publisher 120 when certain conditions are met.

The message management server 110 may store 412 a message series template. The message series built by the message publisher may include one or more messages and a live chat triggering condition. For example, the live chat triggering condition may be provided at a certain point of the message series. When the triggering condition is met, a live chat session may be initiated. The message series may be generic to a plurality of message recipients. A message in the series may include placeholders for inserting personalized information such as customer information in the message. Likewise, the live chat triggering condition may also include a general condition that can be converted to a personalized triggering condition based on the identity and situation of a particular message recipient. A message series template is saved by the message management server 110. The template may be applicable to multiple message recipients to generate personalized messages based on the recipients. In some embodiments, the template may also be general to various recipient device types and channels. For example, the message to be delivered may have a different format based on the screen resolution of the recipient device (e.g., user computing device 132), operating system of the recipient device, the type of channel (e.g., whether the message is sent via SMS, push notification, in-app messaging, or email). The template may be used to generate various formats of a message that has the same payload. The format may be determined based on the information of a particular message recipient. A message series template may also store other data such as recipient selection criteria, channel setting 334, conditions 336, and actions 338 that are discussed in the message series 320 in FIG. 3.

The message management server 110 may generate and provide a message preview 416 to the message publisher 120 through, for example, the GUI of a message building platform. The message series preview may include a simulation of one or more messages in the message series. For example, the simulation may show an appearance of a common phone (e.g., iPHONE, ANDROID PHONE, etc.) and how the simulated message is precisely rendered on the screen of the phone. The message publisher 120 may choose different phones and resolutions to adjust the simulation. An example of the simulation is shown in FIG. 5A.

The message publisher 120 may provide 420 a command to launch the message series. In some embodiments, after the message series is completed, the message building platform provided by the message management server 110 may include a launch button to allow the message publisher 120 to start distributing the message series to different message recipients. In some cases, the message publisher 120 may click the launch button to start, pause, or resume the message series.

Upon receiving the command from the message publisher to launch the message series, the message management server 110 may determine message recipients 422 from a pool of candidate recipients. For example, the pool of candidate recipients may correspond to a list provided by the message publisher 120 (e.g., customers, subscribers, users opted in, etc.) or a list of users of application 134 that is published by the message publisher 120. The message series 320 may be associated with an initial trigger that marks the initiation of an instance of the message series 320. The message management server 110 may monitor events associated with the pool of candidate recipients and determine if an event that meets the conditions of the initial trigger occurs at one or more candidates who fit the criteria as specified by the message publisher 120. In response to the initial trigger, the message management server 110 may implement the message series at the candidate by sending an initial message to the target end user via a first channel 150. The triggering condition for a candidate to be selected may be any condition that is discussed in association with event management engine 215.

After a message series is implemented for a selected message recipient 130, the message management server 110 may transmit 424 at least one of the messages in the message series to the user computing device 132 associated with the message recipient. Each of the messages in the message series may be transmitted at a specific channel. The selection of a channel for a particular message may be based on the channel setting 334 specified by the message publisher 120 or other conditions. The selection of channel may be carried by the channel selection engine 240. While a message series is used as an example in the process 400, the message series may include a single message. For example, the message series may take the form of a single action automation flow that is intended for the message publisher 120 to automate a single action 338. The action, for example, may be launching a live chat session. In some embodiments, the message that is sent to the message recipient may simply be a request for the message recipient to authorize the start of the live chat session. In other embodiments, the message series includes multiple messages and the triggering of the live chat session may be a particular point in the message series.

As the message management server 110 transmits one or more messages to a message recipient, the message management server 110 may continue to monitor the events and activities of the message recipient to determine if additional conditions specified in the message series are met. Additional messages are automatically transmitted and/or actions are automatically launched by the message management server 110 in response to that events and activities that meet the additional conditions are detected. The events and activities of the end users may be monitored by the event management engine 215 as discussed above. Event notifications are provided 426 to message management server 110 by the user computing device 132 and/or the third party server 144. Various examples of event notifications are discussed with reference to event management engine 215. One or more event notifications may be used to determine whether a live chat triggering condition specified in the message series is met.

The message management server 110 may determine 430 that a live chat triggering condition specified in the message series is met. In different message series, the live chat triggering conditions may take various forms that may correspond to different types of event notifications. In a first example, the live chat triggering condition corresponds to a real-life event. The message management server 110 determines that the live chat triggering condition is met by receiving a notification regarding the real-life event. The real-life event notification may be transmitted to the third party server 144, which may be an independent third party or a server associated with the message publisher 120. For example, the real-life event may be a hotel guest (e.g., the message recipient 130) checking in a hotel room. This event may be associated with a message series designed by the hotel to send one or more welcome messages and personalized messages to the hotel guest. The message management server 110 may also provide an option for the hotel guest to accept a live chat session with a hotel agent to discuss any requests related to the use of the hotel.

In a second example, the real-life event may be the successful delivery of a product that is transmitted by a third-party delivering company. The message publisher 120 in this example may be a retail seller that sold the product to a customer. Upon the delivery of the product, the message management server 110 may send information related to the product and asks for product feedbacks as part of the message series designed by the message publisher 120. In some cases, if additional live chat triggering conditions are met, the message management server 110 may ask the customer to enter a live chat to discuss topics such as customer care, the problem associated with the product, installation, feedbacks, etc.

In a third example, the live chat triggering condition may be associated with geolocation detected. For instance, an event organizer may provide live chat options to the participants of the event after detecting that the participants have entered the venue of the event. A tourist organization may also provide a live chat after detecting a tourist is in the proximity of a certain spot. Other use cases are also possible.

In a fourth example, one of the messages in the message series may be sent to a mobile application 134 installed in a user computing device 132 of the end user. The live chat triggering condition may correspond to an action performed by the user with the mobile application 134. Examples of mobile event notifications are discussed with reference to the event management engine 215.

In some cases, there can be multiple live chat triggering conditions that need to be met before a live chat session is offered to a recipient. Those conditions and the order and logic of the conditions may be designed by the message publisher 120 when building the message series. The events and conditions may include responses from a message recipient. The message management server 110 may parse the data in the response to determine the nature of the response. In some cases, after certain events occurred, the message management server 110 determines the response of the message recipients (e.g., feedbacks provided by the message recipients) to determine whether it is appropriate to offer a live chat session. For example, in some cases, a customer may leave negative feedback. Offering a live chat session immediately usually may not be most appropriate in this situation. The message management server 110 may continue to monitor additional responses, if any, from the message recipients and, based on the response, determine that the recipient is interested in further discussion. In such a situation, the message management server 110 may offer the customer to enter a live chat session.

While in various examples disclosed herein describe a live chat is triggered through one or more events, activities, or conditions, a live chat session may also be triggered through other suitable ways in various embodiments. For example, in one embodiment, an end user does not receive a message at all. Instead, she arrives at a live chat session by manually clicking a button in an application 134 in the application navigation menu or another visible call to action. In another embodiment, an end user may enter into a live chat session through an asynchronous live chat message app notification which indicates there is an instant message waiting. In this case, the message that was sent may not have been part of a message series or result from an action trigger. It may have been from a conversation that was manually initiated by a live chat agent.

In some embodiments, the message management server 110 may provide in-app forms for end-users to submit text feedback in an application 134. When the feedback form is submitted by the end user, the end user may see a "Thank you for your feedback" screen and is not entered into a chat at that moment. The form submission in turn creates a potential live chat instance in the live chat manager application provided by the message management server 110. In this case, the potential live chat instance may serve as a pending conversation inbox that can allow a live chat agent to view in-app form submissions, and respond via chat asynchronously. In this case, the live chat agent would not be beholden to the time constraints and expectations of a live conversation. Once the live chat agent responds, the end user receives an in-app notification in the application 134, indicating that a live chat agent has responded to their feedback. The end user may in turn opt to enter a synchronous live chat with an agent after receiving the notification.

The message management server 110 may launch 432 a live chat session on the message publisher end. The message management server 110 may also launch 434 the live chat session 434 on the message recipient end. The launching of a live chat session may vary, depending on embodiments. In some embodiments, one of the messages in the message series is sent to a mobile application 134 installed in a user computing device 132 of an end user. The live chat session may be operated inside the application 134. In some embodiments, launching the live chat causes the end user to switch to a third-party messaging platform. In some embodiments, the live chat is launched through the end user clicking a deep link that directs the user end to a live chat feature of a mobile application 134. In some embodiments, the live chat is launched after an in-application message is sent via a mobile application 134 and the live chat is part of a native feature of the mobile application 134. In some embodiments, one of the messages in the message series is sent through a SDK 136 associated with a mobile application 134 installed in a user computing device 132 and the live chat is part of a feature of the SDK. Additional examples of how a live chat session may be launched are further discussed in FIG. 1 and FIG. 2, for example, in association with messaging platform management engine 255.

In some embodiments, the launching of a live chat session may occur within any reasonable time period after one or more live chat triggering conditions are met. For example, a live chat session may not need to occur immediately after a condition is met. In some embodiments, there are a series of live chat triggering conditions that need to be met before a live chat session is offered to a message recipient. In some embodiments, the message management server 110 may also provide a timing window for the message recipient to enter into a live chat session. The live chat session may connect a message recipient to a natural person agent.

The message publisher 120 may select 436 a live chat agent 402 when a live chat session is established. For example, the message series may include a tag associated with the live chat triggering condition. The tag may be specified by the message publisher 120. The tag may be an identifier of a transaction or an identifier of a sales team or a customer service team that is assigned to serving the message recipients of a particular message series. The live chat may match a natural person agent based on the tag. In some embodiments, the selection of a live chat agent 402 may also be performed by the message management server 110 or the message recipient at the user computing device 132. For example, the live chat agent may be selected based on a routing algorithm run by the message management server 110. The message recipient may also know a specific person that the recipient wants to have a chat session with.

In various embodiments, the live chat agent 402 is a natural person. In other embodiments, the live chat agent 402 may also be a robotic agent or a robotic agent augmenting a natural person. For example, in one embodiment, the live chat session may be conducted automatically by a robotic agent. The message management server 110 uses machine learning models and natural language processing techniques to train the robotic agent to conduct a live chat with the message recipient. In another embodiment, the live chat session may first start with a robotic agent to provide basic information and respond to common questions from the message recipient. In the live chat session, the robotic agent may offer the end user or detect that the end user intends to chat with a natural person. For example, the end user may type in keywords such as "representative." Based on the robotic agent's determination, the live chat session is connected to a natural person agent to continue the session.

In some embodiments, the message management server 110 may forward 438 metadata and channel information to the live chat agent 402. For example, the message management server 110 may determine an event of an end user (e.g., the message recipient) associated with the live chat triggering condition. The message management server 110 may determine a channel associated with an event. For example, the event may be the end user viewing an in-app message, which is associated with the in-app channel. Hence, this specific channel may be important as to why the live chat session is triggered. The message management server 110 may provide the information of the channel and other metadata, such as the message series which the end user is currently receiving, to the natural person agent 402 to provide the natural person agent 402 more contextual information related to the live chat session.

The message recipient, via the user computing device 132, and the live chat agent 402 may conduct 440 a live chat session. In some embodiments, the live chat session allows the natural person agent 402 to specify one or more automated chat messages to be sent to the message recipient. In some embodiments, the natural person agent 402 participates in the live chat session through a live chat interface that is operated by the message management server 110. The live chat interface provides various settings for the natural person agent 402 that are discussed with reference to the front-end interface engine 260. An example of the interface is illustrated in FIG. 6. In some embodiments, the parties conduct the live chat session through a third-party messaging platform. The conclusion of the live chat may be a condition in the message series to continue the message series. In some embodiments, the live chat agent 402 may also select a branch in a message series based on the result of the live chat.

Example Graphical User Interface

FIG. 5A is a conceptual diagram illustrating an example GUI that includes the message series preview 510, in accordance with some embodiments. The message series preview 510 may be part of the GUI of a SaaS platform (or another software platform) that is provided by the message management server 110 for a message publisher 120 to build and design one or more message series 320 that is described in FIG. 3. The previews of the messages may be shown as graphical elements and are arranged in the order of the message series. Each message preview 512 may include two sides. On the front side 514, a simulation of the actual appearance of the message based on a selection of the device model is displayed. The message publisher 120 may select a message preview and turn the message to a flip side 516. In turn, the GUI displays the message settings and includes control elements for the message publisher 120 to adjust the message settings. The GUI in the summary page may also include other information such as the targeting conditions of a message, a time delay between messages, and a control element 518 for the message publisher to add a new message in the series.

The GUI on the summary page may also include a control element 520 to allow the message publisher 120 to toggle between launching and pausing a message series 320. After a message series 320 is built, the message publisher 120 may launch the plan. The message management server 110 may receive a command from the message publisher 120 to start a message series. The message management server 110 may automatically identify target end users as message recipients 130 and transmit messages to the target end users based on the message series 320. The GUI may provide summary statistics of the message series 320 after the series is launched. For example, the message management server 110 may implement a plurality of instances of the message series 320, each instance associated with a message recipient 130. The message management server 110 may monitor the number of instances that meet the end condition as specified by the message publisher 120 before the expiration of the instance. The message management server 110 may generate a report summarizing the effectiveness of the message series 320. The message management server 110 may also provide real-time statistics in GUI.

In building the message series, the message publisher 120 may add an interactive event such as a live chat triggering condition between two messages or attached to a message. The interactive event may be associated with one or more triggering conditions. Setting up an interactive event is further described in FIG. 5B through SD.

FIG. 5B is an example GUI 530 for a message publisher 120 to set up an automation, in accordance with some embodiments. The automation can be standalone automation or a part of the message series. For example, automation may be a step in a message series that is shown in FIG. 5A. The GUI 530 allows a message publisher 120 to specify various settings associated with the automation, including triggering conditions, options, and channels. The triggering conditions can be suitable triggering conditions that have been described in this disclosure. In the particular example shown in FIG. 5B, the triggering condition is a real-life event. The GUI 530 also allows the message publisher 120 to specify options such as rule limits, audience conditions, and cancellation events. The GUI 530 also provides channel selection options.

Figure 5C:
FIG. 5C is an example GUI for a message publisher to specify an interactive action, in accordance with some embodiments.

FIG. 5C is an example GUI 540 for a message publisher 120 to specify an interactive action, in accordance with some embodiments. The GUI 540 may be part of the automation setup and a continuation of GUI 530. The GUI 540 allows the message publisher 120 to specify an interactive action to be launched when the triggering condition(s) are met. The message publisher 120 may also design a message to be sent prior to the launch of the interactive action. The message may serve as an introductory message to the message recipient 130 and/or a request for the message recipient 130 to accept an interactive session such as a live chat session. The GUI 540 includes an action selection menu 542 in which the message publisher 120 may select the type of action to be launched. In the particular example shown in FIG. 5C, the action selected is a transmission of a deep link to the message recipient 130. For example, the deep link may be used to open the live chat feature in the SDK 136 or to open the messaging platform 142.

The GUI 540 may also include a message builder box 544 for the message publisher 120 to input the text of a message to be sent before an interactive session is launched. The GUI may provide a simulation 546 of the actual appearance of the message in an end user device that receives the message via a particular channel 150. The GUI may provide a selection 548 of potential end user device models. Upon a change in the selection of the end user device model, the GUI 540 may re-render another simulation of the actual appearance of the message based on the device model and the resolution of the device model in the simulation area 546. In some cases, certain types of channels or certain device models may not support certain formats or have limitations on the message payload (e.g., a certain channel may only support text and may resize an image in the message), the message management server 110 takes into account of those limitations in rendering the simulation. Through the GUI 540, the message publisher 120 may also specify other features 552 related to a message such as including an interactive button, a title of the message, a summary, and multimedia contents.

Figure 5D:
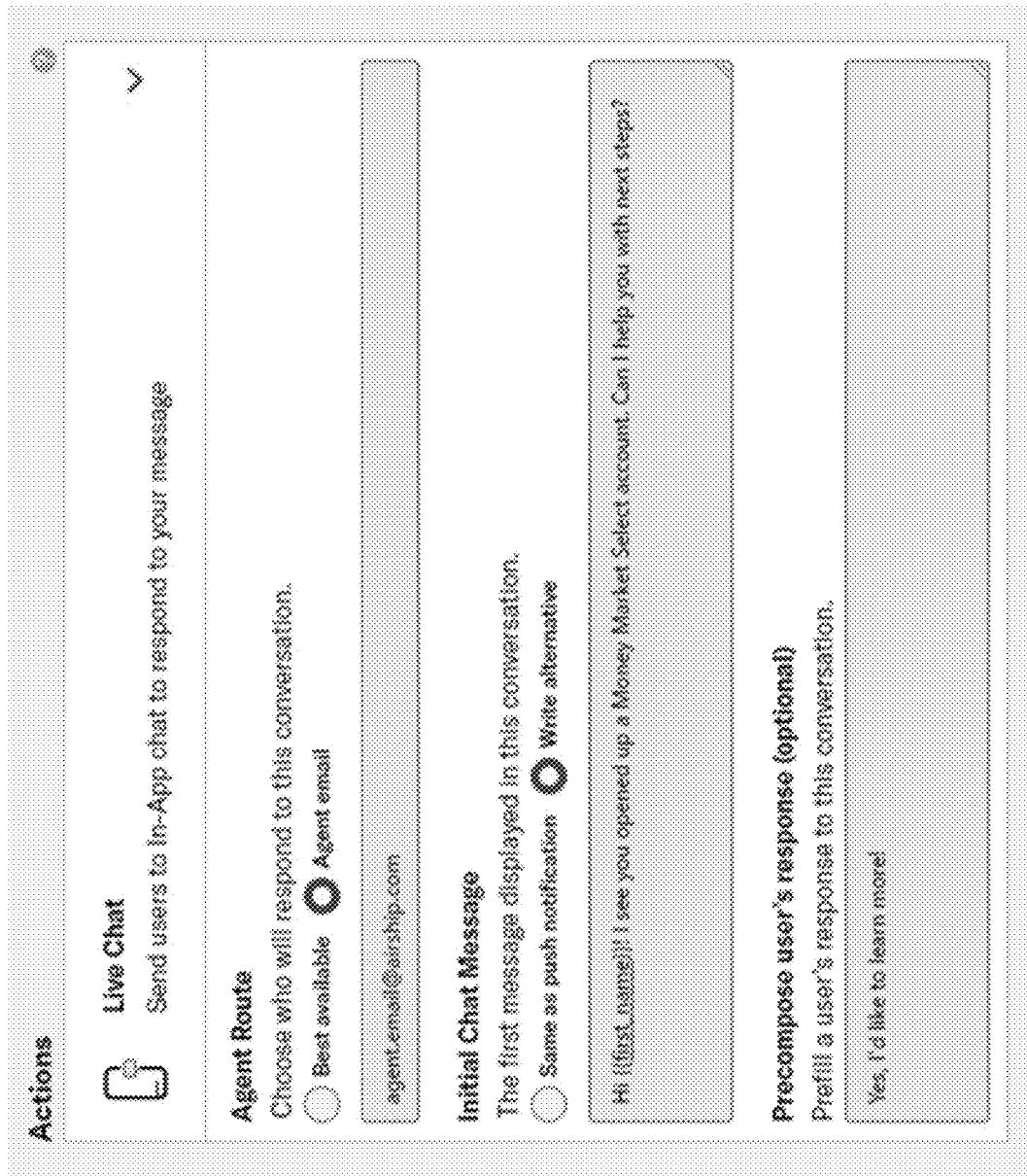
FIG. 5D is an example GUI for a message publisher to customize a live chat session, in accordance with some embodiments.

The GUI may also allow the message publisher 120 to further customize the live chat session. FIG. 5D is an example GUI 560 that provides options for the message publisher 120 to further customize options such as initial settings of the live chat session in a message series. The first option allows the message publisher 120 to specify the selection of the live chat agent. The option can be the next best available agent or a specific agent. For example, the message publisher 120 may assign a salesperson to be the live chat agent for live chats related to a particular product or service. In another example, the message series may be sent to a selected group of end users and the salesperson may be assigned to handle questions from the group of users. The second option in the GUI 560 allows the message publisher 120 to specify the initial chat message that will be automatically sent to an end user who enters the live chat session. The initial chat message may be the same as the push notification or a custom one that may include one or more parameters (e.g., first_name) that will be replaced with personal information tailored to the end user. The third option of the GUI 560 allows the message publisher 120 to specify the initial end-user response that can be pre-filled in the typing area of the end user's live chat session. This allows the end user to quickly respond in the live chat session without having to type the initial message.

Figure 5E:
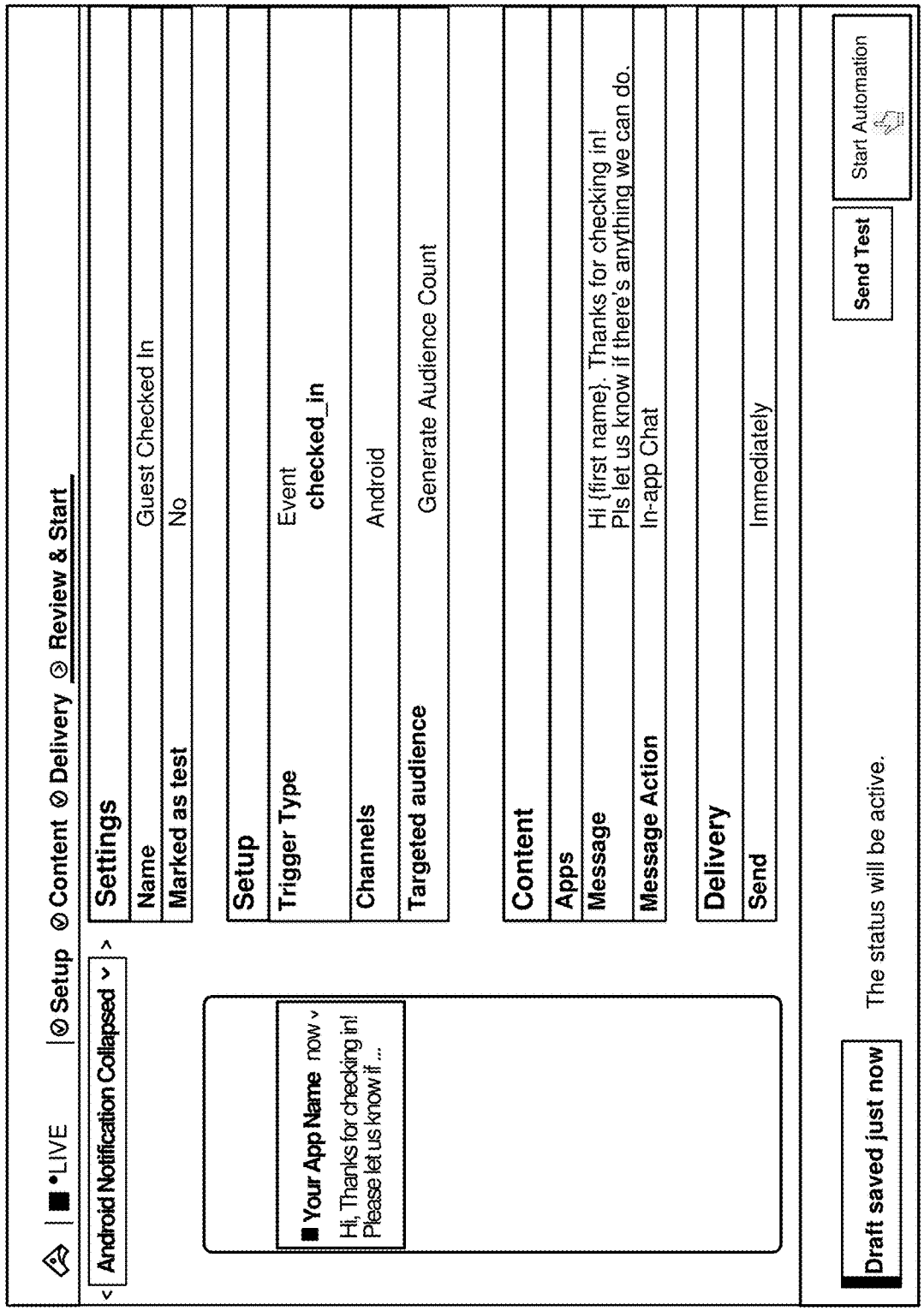
FIG. 5E is an example GUI that displays a summary of an automation setup, in accordance with some embodiments.

FIG. 5E is an example GUI 580 that displays a summary of an automation setup, in accordance with some embodiments. The GUI 580 provides the summary and a message preview. The summary shows that an interactive action specified is an in-app chat. The GUI 580 allows the message publisher 120 to start the automation. The message publisher 120 may toggle the start and stop of the automation.

FIG. 6 is an example GUI of a messaging platform 600, in accordance with some embodiments. The messaging platform 600 may be provided by the message management server 110 for a live chat agent to chat with an end user. The messaging platform 600 may be used when a live chat session is launched in an automation, such as that created in FIG. 5A through FIG. 5D. The messaging platform 600 may provide data related to the message series to the live chat agent to provide more context for the agent. For example, the messaging platform 600 may include information such as a channel that engaged the end user in a live chat session. The messaging platform 600 may also include a message series identifier and a link to the message series in which the end user currently receives messages. The messaging platform 600 may also provide triggering conditions that bring the end user to the live chat session. Other information may also be present in the messaging platform 600.

Computing Machine Architecture

Figure 7:
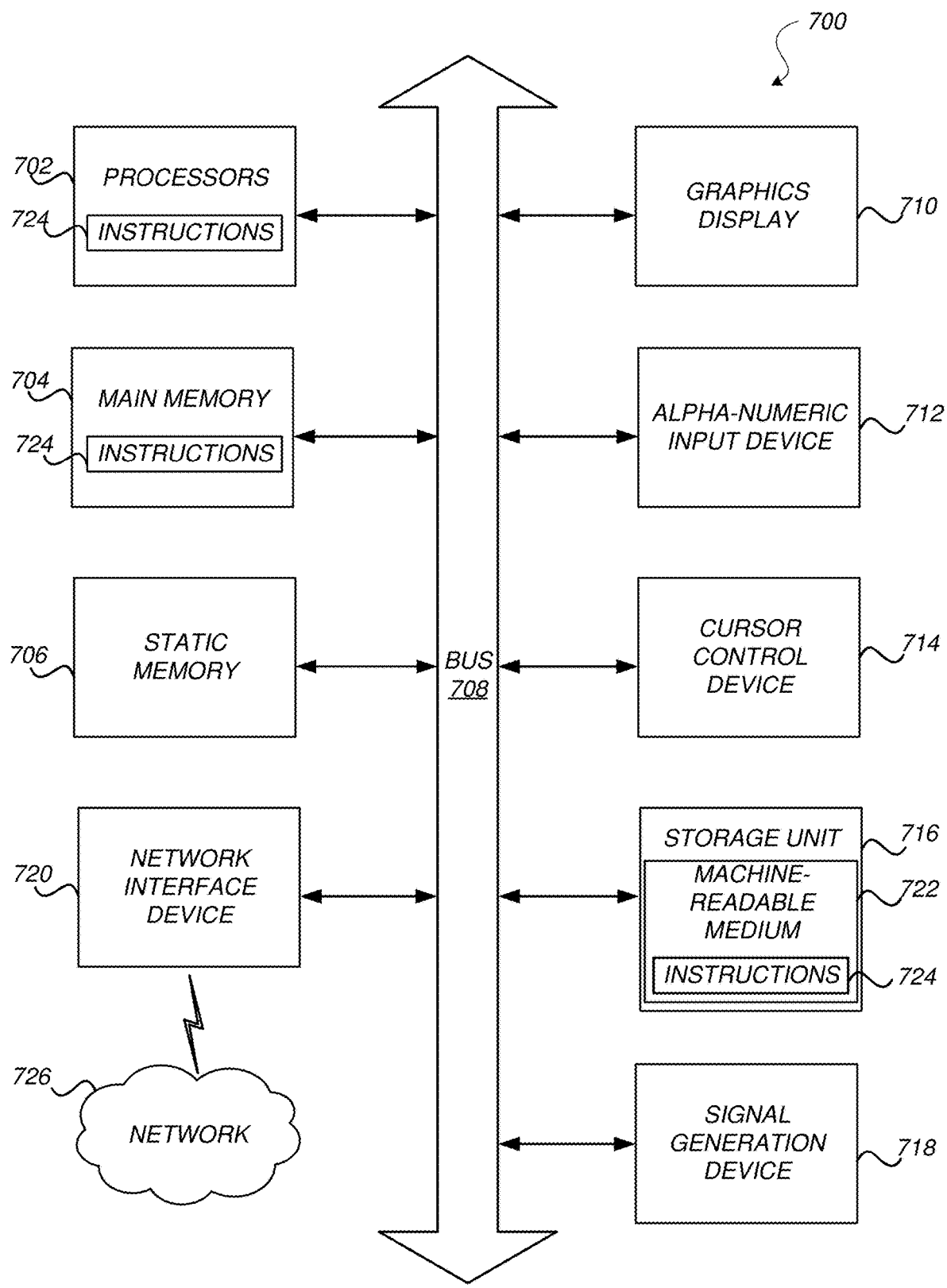
FIG. 7 is a block diagram illustrating components of an example computing machine, in accordance with some embodiments.

FIG. 7 is a block diagram illustrating components of an example computing machine that is capable of reading instructions from a computer-readable medium and execute them in a processor (or controller). A computer described herein may include a single computing machine shown in FIG. 7, a virtual machine, a distributed computing system that includes multiples nodes of computing machines shown in FIG. 7, or any other suitable arrangement of computing devices.

By way of example, FIG. 7 shows a diagrammatic representation of a computing machine in the example form of a computer system 700 within which instructions 724 (e.g., software, source code, program code, bytecode, or machine code), which may be stored in a computer-readable medium for causing the machine to perform any one or more of the processes discussed herein may be executed. In some embodiments, the computing machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 7 may correspond to any software, hardware, or combined components shown in FIGS. 1 and 2, including but not limited to, the message management server 110, the client server 125, the user computing device 132 and various engines, interfaces, terminals, and machines shown in FIG. 2. While FIG. 7 shows various hardware and software elements, each of the components described in FIG. 1 or FIG. 2 may include additional or fewer elements. Further, the instructions may correspond to the functionality of components and interfaces described with FIGS. 1-9.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 724 that specify actions to be taken by that machine. Further, while only a single machine is illustrated, the term "machine" and "computer" may also be taken to include any collection of machines that individually or jointly execute instructions 724 to perform any one or more of the methodologies discussed herein.

The example computer system 700 includes one or more processors 702 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 700 may also include a memory 704 that store computer code including instructions 724 that may cause the processors 702 to perform certain actions when the instructions are executed, directly or indirectly by the processors 702. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 702 and reduces the space required for the memory 704. For example, the methods described herein reduce the complexity of the computation of the processors 702 by applying one or more novel techniques that simplify the steps in training, reaching convergence, and generating results of the processors 702. The algorithms described herein also reduces the size of the models and datasets to reduce the storage space requirement for memory 704.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 700 may include a main memory 704, and a static memory 706, which are configured to communicate with each other via a bus 708. The computer system 700 may further include a graphics display unit 710 (e.g., a plasma display panel (PDP), a liquid crystal display (LCD), a projector, or a cathode ray tube (CRT)). The graphics display unit 710, controlled by the processors 702, displays a GUI (GUI) to display one or more results and data generated by the processes described herein. The computer system 700 may also include an alphanumeric input device 712 (e.g., a keyboard), a cursor control device 714 (e.g., a mouse, a trackball, a joystick, a motion sensor, or another pointing instrument), a storage unit 716 (a hard drive, a solid state drive, a hybrid drive, a memory disk, etc.), a signal generation device 718 (e.g., a speaker), and a network interface device 720, which also are configured to communicate via the bus 708.

The storage unit 716 includes a computer-readable medium 722 on which is stored instructions 724 embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting computer-readable media. The instructions 724 may be transmitted or received over a network 726 via the network interface device 720.

While computer-readable medium 722 is shown in an example embodiment to be a single medium, the term "computer-readable medium" should be taken to include a single medium or multiple media (e.g., a centralized or distributed database, or associated caches and servers) able to store instructions (e.g., instructions 724). The computer-readable medium may include any medium that is capable of storing instructions (e.g., instructions 724) for execution by the processors (e.g., processors 702) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Beneficially, the message management server provides a platform for various message publishers to delegate the task of distributing messages via various channels to the message management server. Transmission of messages through different channels may be technically challenging for many organizations because each channel may have its own requirement, communication protocol, infrastructure with which organizations may not be equipped. By providing a user-friendly user interface to the message publishers for them to build message series, the message management server manages the technical difficulties for the message publishers. The appearance, contents, and overall feeling of the message may be changed significantly when a different channel is used to deliver the message. The graphical user interface may also provide simulations of the messages as rendered in end users' computing devices, thereby providing the message publishers with previews of the messages that could have dramatically different appearances when transmitted via different channels and rendered in different operating systems and models of computing devices. The message management also allows more complex interaction such as live chat to be triggered at a correct moment to enhance the user experience.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A system, comprising:
a graphical user interface configured to:
receive selections, from a message publisher, to build a message series, the message series comprising one or more messages and a live chat triggering condition; and
generate a message series preview of the message series, the message series preview comprising a simulation of a message in the message series, the message series comprising a first message and a second message, the first message to be sent via a software development kit (SDK) incorporated in a mobile application, the SDK being a first channel, the second message to be sent via a second channel; and a message management server in communication with the graphical user interface, the message management server comprising a processor and memory storing instructions, the instructions, when executed by the processor, cause the processor to:
  receive a command from the message publisher to launch the message series;
  transmit, via at least the first channel and the second channel, the first message and the second message in the message series to an end user;
  determine that the live chat triggering condition is met; and
  launch a live chat based on the live chat triggering condition being met, the live chat launched in the mobile application by the SDK, the SDK establishing a third channel different from the first channel or the second channel, the third channel connecting the end user to a natural person agent in the live chat.

2. The system of claim 1, wherein one of the messages in the message series is sent to the mobile application installed in a user device of the end user and the live chat is operated inside the mobile application.

3. The system of claim 1, wherein launching the live chat causes the end user to switch to a third-party messaging platform.

4. The system of claim 1, wherein the live chat triggering condition corresponds to a real life event and the message management server determines that the live chat triggering condition is met by receiving a notification regarding the real life event.

5. The system of claim 1, wherein at least one of the messages in the message series is sent to the mobile application installed in a user device of the end user and the live chat triggering condition corresponds to an action performed by user with the mobile application.

6. The system of claim 1, wherein the live chat triggering condition is associated with a geolocation detected.

7. The system of claim 1, wherein the natural person agent is associated with the message publisher and chat messages in the live chat are forwarded to the message management server to allow the message publisher to access the chat messages.

8. The system of claim 1, wherein the live chat is launched through the end user clicking a deep link that directs the user end to a live chat feature of the mobile application.

9. The system of claim 1, wherein the live chat is launched after an in-application message is sent via the mobile application and the live chat is part of a native feature of the mobile application enabled by the SDK.

10. The system of claim 1, wherein one of the messages in the message series is sent through the software development kit (SDK) associated with the mobile application installed in a user device of the end user and the live chat is part of a feature of the SDK.

11. The system of claim 1, wherein the one or more messages in the message series are sent to the end user via a plurality of channels, and wherein the instructions, when executed, further cause the processor to:
  determine an event of the end user associated with the live chat triggering condition;
  determine a channel associated with the event; and
  provide information of the channel to the natural person agent.

12. The system of claim 1, wherein the message series includes a tag associated with the live chat triggering condition, the tag specified by the message publisher, and the live chat matches natural person agent based on the tag.

13. The system of claim 1, wherein the live chat allows the natural person agent to specify one or more automated chat messages to be sent to the end user.

14. The system of claim 1, wherein the natural person agent participates in the live chat through a live chat interface that is operated by the message management server.

15. A computer-implemented method, comprising:
  receiving selections, from a message publisher, to build a message series, the message series comprising one or more messages and a live chat triggering condition;
  generating a message series preview of the message series, the message series preview comprising a simulation of a message in the message series, the message series comprising a first message and a second message, the first message to be sent via a software development kit (SDK) incorporated in a mobile application, the SDK being a first channel, the second message to be sent via a second channel;
  receiving a command from the message publisher to launch the message series;
  transmitting, via at least the first channel and the second channel, the first message and the second message in the message series to an end user;
  determining that the live chat triggering condition is met; and
  launching a live chat based on the live chat triggering condition being met, the live chat launched in the mobile application by the SDK, the SDK establishing a third channel different from the first channel or the second channel, the third channel connecting the end user to a natural person agent in the live chat.

16. The computer-implemented method of claim 15, wherein one of the messages in the message series is sent to a mobile application installed in a user device of the end user and the live chat is operated inside the mobile application.

17. The computer-implemented method of claim 15, wherein one of the messages in the message series is sent through a software development kit (SDK) associated with a mobile application installed in a user device of the end user and the live chat is part of a feature of the SDK.

18. The computer-implemented method of claim 15, wherein at least one of the messages in the message series is sent to a mobile application installed in a user device of the end user and the live chat triggering condition corresponds to an action performed by user with the mobile application.

19. The computer-implemented method of claim 15, wherein the live chat is launched through the end user clicking a deep link that directs the user end to a live chat feature of a mobile application.

20. A non-transitory computer-readable medium configured to store computer code comprising instructions, the instructions, when executed by one or more processors, cause the one or more processors to perform step comprising:
  receiving selections, from a message publisher, to build a message series, the message series comprising one or more messages and a live chat triggering condition;
  generating a message series preview of the message series, the message series preview comprising a simulation of a message in the message series, the message series comprising a first message and a second message, the first message to be sent via a software development kit (SDK) incorporated in a mobile application, the SDK being a first channel, the second message to be sent via a second channel;

receiving a command from the message publisher to launch the message series;

transmitting, via at least the first channel and the second channel, the first message and the second message in the message series to an end user;

determining that the live chat triggering condition is met; and launching a live chat based on the live chat triggering condition being met, the live chat launched in the mobile application by the SDK, the SDK establishing a third channel different from the first channel or the second channel, the third channel connecting the end user to a natural person agent in the live chat.

\* \* \* \* \*